(12) United States Patent
Maturana et al.

(10) Patent No.: US 11,582,127 B2
(45) Date of Patent: Feb. 14, 2023

(54) IIOT ASYMMETRIC REACTIVE BUFFERING TO DYNAMICALLY MANAGE AND OPTIMIZE IN-MOTION DATA BATCH SIZE

(71) Applicant: Rockwell Automation Technologies, Inc., Mayfield Heights, OH (US)

(72) Inventors: Francisco P. Maturana, Lyndhurst, OH (US); Dennis Jinghui Luo, Germantown, WI (US); Robert Nunoo, Mundelein, IL (US); Nikhil Ashok Patange, Pune (IN); Krutika Sanjay Kansara, Pune (IN); Jay W. Schiele, Union Grove, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/209,810

(22) Filed: Mar. 23, 2021

(65) Prior Publication Data
US 2022/0311689 A1 Sep. 29, 2022

(51) Int. Cl.
*H04L 43/0852* (2022.01)
*H04L 43/0882* (2022.01)
(Continued)

(52) U.S. Cl.
CPC ........ *H04L 43/0852* (2013.01); *H04L 43/062* (2013.01); *H04L 43/0882* (2013.01); *H04L 43/10* (2013.01); *H04L 41/12* (2013.01)

(58) Field of Classification Search
CPC .............. H04L 43/0852; H04L 43/062; H04L 43/0882; H04L 43/10; H04L 41/12
See application file for complete search history.

(56) References Cited

U.S. PATENT DOCUMENTS

| | | | |
|---|---|---|---|
| 10,313,947 B1* | 6/2019 | Sung | H04W 24/08 |
| 2010/0158032 A1* | 6/2010 | Carlsson | H04L 47/22 |
| | | | 370/412 |

(Continued)

OTHER PUBLICATIONS

McInnis, A. et al. | Streaming Data Solutions on AWS with Amazon Kinesis. Amazon Web Services, Inc. or its affiliates, Jul. 2017, 29 pages.

(Continued)

*Primary Examiner* — Brian Whipple
*Assistant Examiner* — James Ross Hollister
(74) *Attorney, Agent, or Firm* — Amin, Turocy & Watson, LLP

(57) ABSTRACT

A reactive buffering system for use in IIoT data pipelines dynamically adjusts data accumulation and delivery by a node of a pipeline based on aggregated downstream metrics representing current data processing latencies of downstream nodes. Based on these downstream performance metrics, a reactive node that adjusts the size of the next data batch to be sent to an adjacent downstream node. The nodes of the data pipeline are configured to support a request-response based handshaking protocol whereby the nodes that send data to downstream nodes maintain up-to-date performance level information from adjacent downstream nodes. With this performance information, together with pipeline priorities, the sending node (or reactive node) adjusts the transmission rate and intermediate buffering of data. In this way, the nodes of the pipeline can dynamically regulate interim data storage to avoid overwhelming the pipeline system with too much data during periods of high latency.

20 Claims, 22 Drawing Sheets

(51) Int. Cl.
  *H04L 43/062* (2022.01)
  *H04L 43/10* (2022.01)
  *H04L 41/12* (2022.01)

(56) References Cited

U.S. PATENT DOCUMENTS

| | | | | |
|---|---|---|---|---|
| 2014/0156707 A1* | 6/2014 | Sax | ................. | G06F 9/5066 707/798 |
| 2019/0007349 A1* | 1/2019 | Wang | ................. | H04L 47/365 |
| 2019/0158371 A1* | 5/2019 | Dillon | ................. | H04L 43/087 |
| 2020/0136948 A1* | 4/2020 | Akhouri | ................. | H04L 63/1425 |
| 2021/0105530 A1* | 4/2021 | Lassure | ................. | H04N 21/43079 |

OTHER PUBLICATIONS

Oussous, A. et al. | Big Data technologies: A survey. Journal of King Saud University—Computer and Information Sciences, vol. 30, Issue 4, Oct. 2018, 55 pages.

Swensson, E. et al. | Big Data Analytics Options on AWS. Amazon Web Services, Inc. or its affiliates, Dec. 2018, 56 pages.

Ismail, A. et al. | Manufacturing process data analysis pipelines: a requirements analysis and survey. J Big Data 6, 1 (2019). https://doi.org/10.1186/s40537-018-0162-3, 26 pages.

Evolution of the Netflix Data Pipeline. Netflix Technology Blog, Feb. 2016, 7 pages. https://netflixtechblog.com/evolution-of-the-netflix-data-pipeline-da246ca36905.

What is streaming data? Amazon Web Services, Inc. or its affiliates, 2021, 8 pages.

Wikipedia | Voice over IP. 12 pages. https://en.wikipedia.org/wiki/Voice_over_IP.

Yates, J. | Stream Processing with IoT Data: Challenges, Best Practices, and Techniques. Jun. 4, 2020, 19 pages. https://www.confluent.io/blog/stream-processing-iot-data-best-practices-and-techniques/.

Microsoft Stream video delivery and network overview. Aug. 7, 2020, 11 pages. https://docs.microsoft.com/en-us/stream/network-overview.

\* cited by examiner

IIOT ASYMMETRIC REACTIVE BUFFERING TO DYNAMICALLY MANAGE AND OPTIMIZE IN-MOTION DATA BATCH SIZE

BACKGROUND

The subject matter disclosed herein relates generally to industrial automation, and, more particularly, collection of industrial data.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a node system is provided, comprising a data input component configured to receive industrial data from an adjacent upstream node system of a data pipeline and to queue the industrial data to yield queued data; a data output component configured to send subsets of the queued data to an adjacent downstream node system of the data pipeline in data batches; a batch size calculation component configured to determine a size of a next data batch, of the data batches, based on performance metric data received from the adjacent downstream node system; and a batch size setting component configured to instruct the data output component to send the next data batch in accordance with the size determined by the batch size calculation component.

Also, one or more embodiments provide a method, comprising queuing, by a node system comprising a processor, industrial data received from an adjacent upstream node system of a data pipeline to yield queued data; determining, by the node system, a size of a next data batch to be sent to an adjacent downstream node system of the data pipeline based on performance metric data received from the adjacent downstream node system; and sending, by the node system, a subset of the queued data to the adjacent downstream node system of the data pipeline as the next data batch in accordance with the size.

Also, according to one or more embodiments, a non-transitory computer-readable medium is provided having stored thereon instructions that, in response to execution, cause a node system comprising a processor and acting as a node of a data pipeline to perform operations, the operations comprising queuing industrial data received from an adjacent upstream node system of the data pipeline to yield queued data; determining a size of a next data batch to be sent to an adjacent downstream node system of the data pipeline based on performance metric data received from the adjacent downstream node system; and sending a subset of the queued data to the adjacent downstream node system of the data pipeline as the next data batch in accordance with the size.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
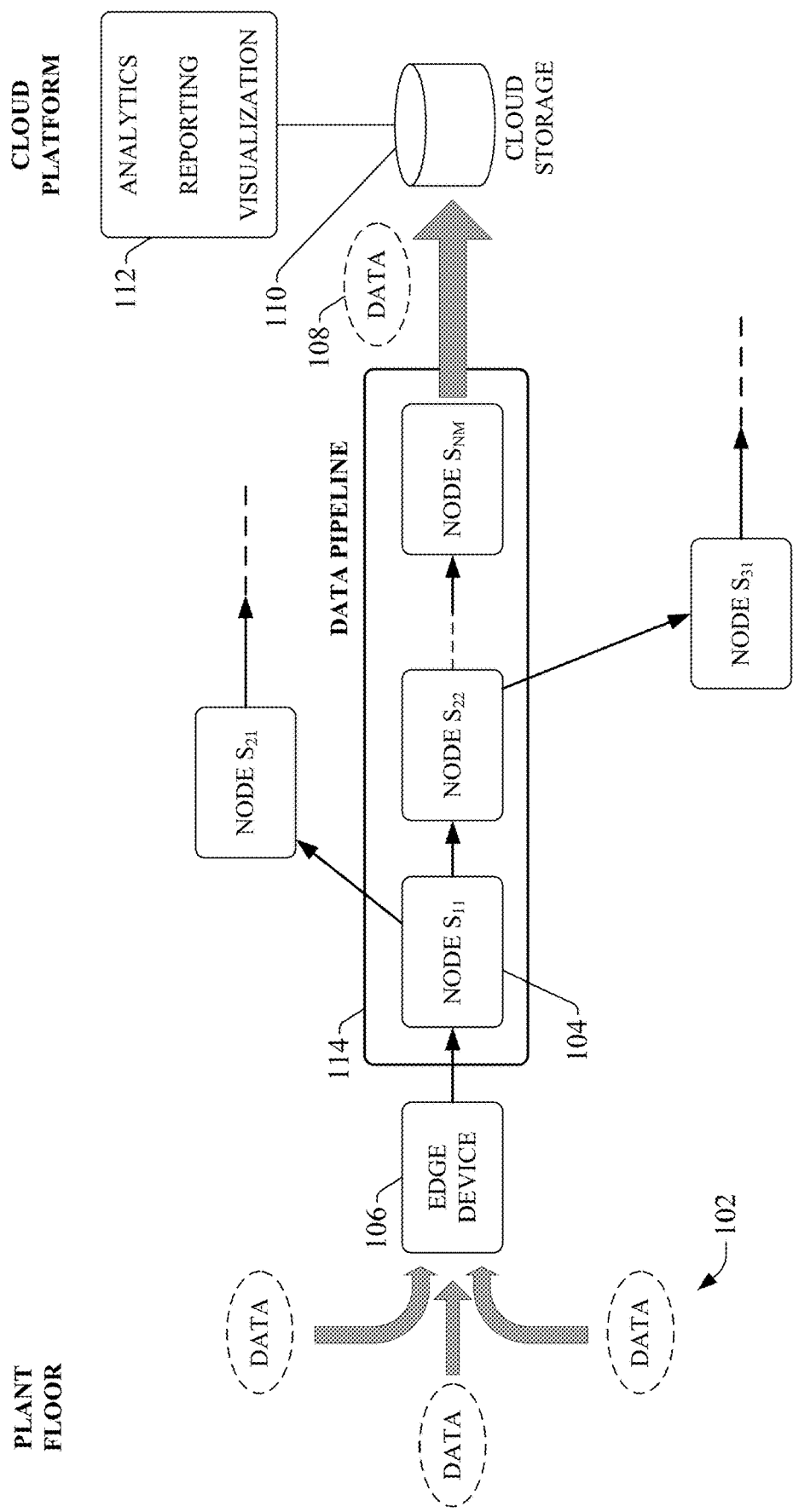
FIG. 1 is a diagram illustrating an example IIoT data pipeline.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Because of the large number of system variables that must be monitored and controlled in near real-time, industrial automation systems often generate vast amounts of near real-time data. In addition to production statistics, data relating to machine health, alarm statuses, operator feedback, electrical or mechanical load over time, and the like are often monitored, and in some cases recorded, on a continuous basis. This data is generated by the many industrial devices that make up a typical automation system, including the industrial controller and its associated I/O, telemetry devices for near real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. The amount of generated automation data further increases as additional plant facilities are added to an industrial enterprise.

To gain insights into the operation of plant-floor automation systems and processes, this high-density industrial data can be collected and streamed to an analytics, visualization, or reporting system residing on a cloud platform or another high-level platform via a data pipeline, or a network of parallel data pipelines, as part of an industrial internet of things (IIoT) architecture. FIG. 1 is a diagram illustrating an example IIoT data pipeline. Data pipeline 114 can comprise a series of chained nodes 104 capable of relaying aggregated industrial data 102 from an edge device 106 residing on the plant floor to cloud storage 110. Nodes 104 may be server devices, microservices executing on respective computer hardware platforms, or other such processing elements. Each of the chained nodes 104 receives data from an adjacent upstream node 104 and passes this data to an adjacent downstream node 104 to thereby convey data from the source to the destination. In some architectures, a sending node can be connected to multiple upstream feeder nodes and/or multiple downstream receiving nodes. In addition to conveying collected industrial data through the pipeline 114, a given node 104 may also perform processing on received data in accordance with a data processing application installed on the node 104. Such application may include, but are not limited to, notification applications that generate and send notifications to specified client devices if any of the data satisfies a defined notification criterion, data transformation applications that transform or reformat the data to suit the needs of a target application (e.g., filtering, data reduction, anomaly detection, aggregation, compression, truncation, contextualization), or other such applications.

Any of the nodes 104 or edge device 106 may perform processing on the collected data 102 as the data is streaming through the pipeline 114, and as such the data 108 that is delivered to the cloud storage 110 may be a processed or reduced version of the data 102 collected from the plant floor devices and sensors that make up the plant floor automation systems. Once the data 108 has been moved to cloud storage 110, the data 108 can be analyzed or visualized by high-level applications 112.

In some architectures, the edge device 106 may collect data from the industrial devices at fixed data collection rates, while the nodes 104 may process and convey incoming data at variable throughputs. IIoT solutions that include parallel data pipelines (e.g., chained nodes 104) typically lack prioritization strategies for delivering industrial data, and do not regulate the volume of data transfer between nodes of the pipeline 114. In industrial applications in which large volumes of data are being streamed from the plant floor to the cloud platform, this lack of prioritization and regulation can result in data congestion or choking of the pipeline 114, particularly when nodes 104 fail to adjust to spikes in upstream data volume or when downstream nodes 104 experience slow data throughput. This data congestion can negatively impact the pipeline's data delivery reliability. Moreover, when data congestion is experienced at a node 104 of the pipeline 114, this congestion can quickly propagate to upstream nodes 104, and if not addressed may lead to critical data loss or long disaster recovery cycles.

To address these and other issues, one or more embodiments described herein provide a reactive buffering system for use in IIoT data pipelines. The reactive buffering system can dynamically adjust data accumulation and delivery by a node of a pipeline based on aggregated downstream metrics (ADM) representing current data processing latencies of downstream nodes. Based on these downstream performance metrics, the reactive buffering system adjusts the size of the next data batch to be sent to the adjacent downstream reduction node. To this end, the nodes of the data pipeline are configured to support a request-response based handshaking protocol whereby the nodes that send data to downstream nodes maintain up-to-date performance level information from adjacent downstream nodes. With this performance information, together with pipeline priorities, the sending node (or reactive node) can adjust the transmission rate and intermediate buffering of data. In this way, the nodes of the pipeline can dynamically regulate interim data storage to avoid overwhelming the pipeline system with too much data during periods of high latency (e.g., busy periods, data spikes, processing issues, etc.).

Figure 2:
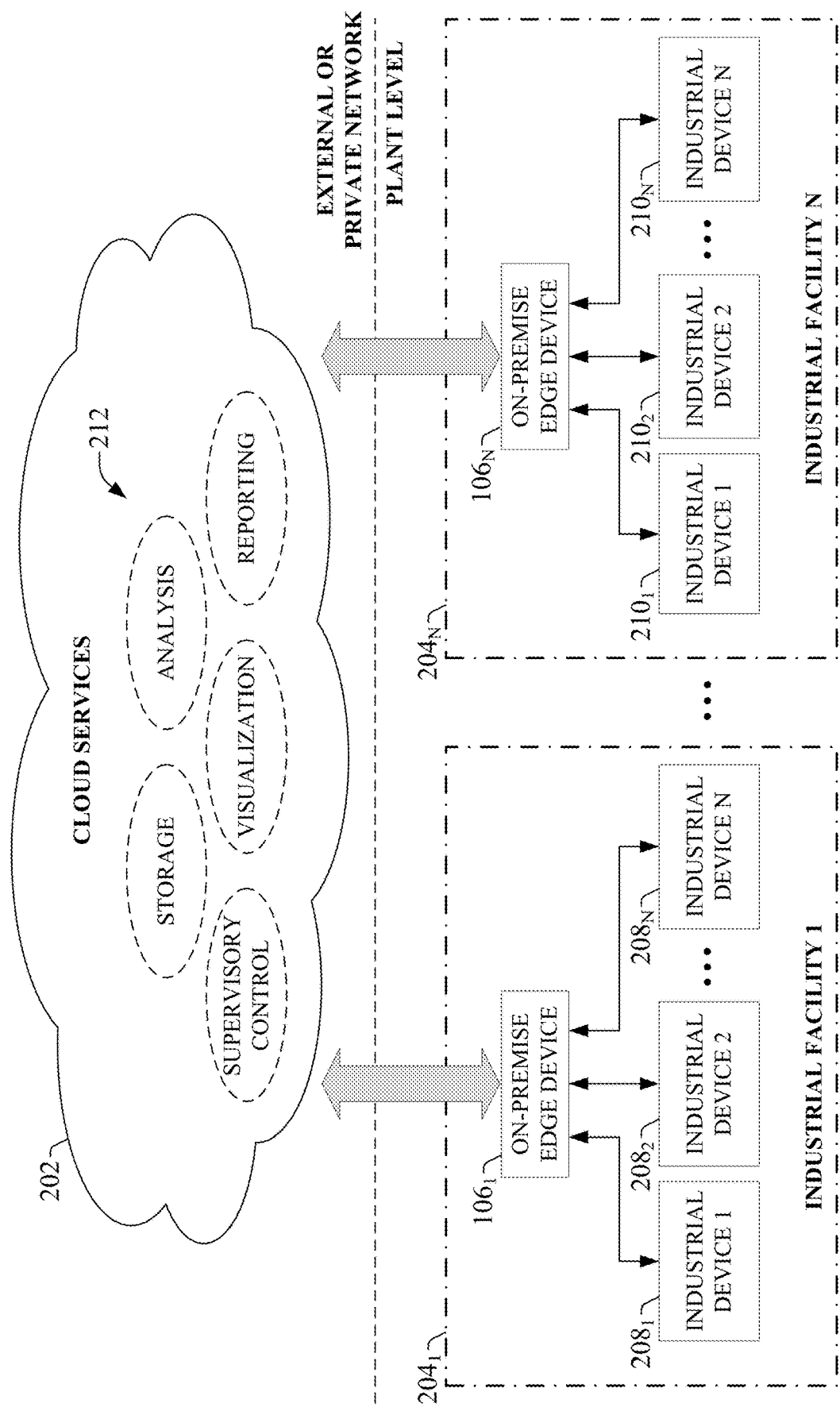
FIG. 2 illustrates a high-level overview of an architecture in which data from an industrial enterprise can be migrated to a cloud platform.

As noted above, the reactive buffering system described herein can be used as part of an IIoT data pipeline used to migrate data generated at one or more plant facilities to a cloud environment for storage, analysis, reporting, or visualization. FIG. 2 illustrates a high-level overview of an architecture in which data from an industrial enterprise can be migrated to a cloud platform. This architecture is an example context in which embodiments of the reactive buffering system can be used. The enterprise comprises one or more industrial facilities 204, each having a number of industrial devices 208 and 210 in use. The industrial devices 208 and 210 can make up one or more automation systems operating within the respective facilities 204. Example automation systems can include, but are not limited to, batch control systems (e.g., mixing systems), continuous control systems (e.g., PID control systems), or discrete control systems. Industrial devices 208 and 210 can include such devices as industrial controllers (e.g., programmable logic controllers or other types of programmable automation controllers); field devices such as sensors and meters; motor drives; operator interfaces (e.g., human-machine interfaces, industrial monitors, graphic terminals, message displays, etc.); industrial robots, barcode markers and readers; vision system devices (e.g., vision cameras); safety relays, optical safety systems, or other such industrial devices.

Industrial automation systems can include one or more industrial controllers that facilitate monitoring and control of their respective processes. These industrial controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the example architecture illustrated in FIG. 2 depicts the industrial devices 208 and 210 as residing in fixed-location industrial facilities 204, the industrial devices 208 and 210 may also be part of a mobile control application, such as a system contained in a truck or other service vehicle.

On-premise edge devices 106 can collect data from industrial devices 208 and 210—or from other data sources, including but not limited to data historians, business-level systems, etc.—and feed this data into a data pipeline (e.g., pipeline 114 in FIG. 1) which migrates the data to the cloud platform 202 for processing and storage. Cloud platform 202 can be any infrastructure that allows cloud services 212 to be accessed and utilized by cloud-capable devices. Cloud platform 202 can be a public cloud accessible via the Internet by devices having Internet connectivity and appropriate authorizations to utilize the services 212. In some scenarios, cloud platform 202 can be provided by a cloud provider as a platform-as-a-service (PaaS), and the services 212 (e.g., data analysis, visualization, reporting, etc.) can reside and execute on the cloud platform 202 as a cloud-based service. In some such configurations, access to the cloud platform 202 and the services 212 can be provided to customers as a subscription service by an owner of the services 212. Alternatively, cloud platform 202 can be a private or semi-private cloud operated internally by the enterprise, or a shared or corporate cloud environment. An exemplary private cloud can comprise a set of servers hosting the cloud services 212 and residing on a corporate network protected by a firewall.

Cloud services 212 can include, but are not limited to, data storage, data analysis, control applications (e.g., applications that can generate and deliver control instructions to industrial devices 208 and 210 based on analysis of real-time system data or other factors), automation system or process visualization applications (e.g., a cloud-based HMI), reporting applications, Enterprise Resource Planning (ERP) applications, notification services, or other such applications. Cloud platform 202 may also include one or more object models to facilitate data ingestion and processing in the cloud.

Ingestion of industrial device data in the cloud platform 202 can offer a number of advantages particular to industrial automation. For one, cloud-based storage offered by the cloud platform 202 can be easily scaled to accommodate the large quantities of data generated daily by an industrial enterprise. Moreover, multiple industrial facilities at different geographical locations can migrate their respective automation data to the cloud for aggregation, collation, collective analysis, visualization, and enterprise-level reporting without the need to establish a private network between the facilities. In another example application, cloud-based diagnostic applications can monitor the health of respective automation systems or their associated industrial devices across an entire plant, or across multiple industrial facilities that make up an enterprise. Cloud-based lot control applications can be used to track a unit of product through its stages of production and collect production data for each unit as it passes through each stage (e.g., barcode identifier, production statistics for each stage of production, quality test data, abnormal flags, etc.). Moreover, cloud-based control applications can perform remote decision-making for a controlled industrial system based on data collected in the cloud from the industrial system, and issue control commands to the system. These industrial cloud-computing applications are only intended to be exemplary, and the systems and methods described herein are not limited to these particular applications. The cloud platform 202 can allow software vendors to provide software as a service, removing the burden of software maintenance, upgrading, and backup from their customers.

Figure 3:
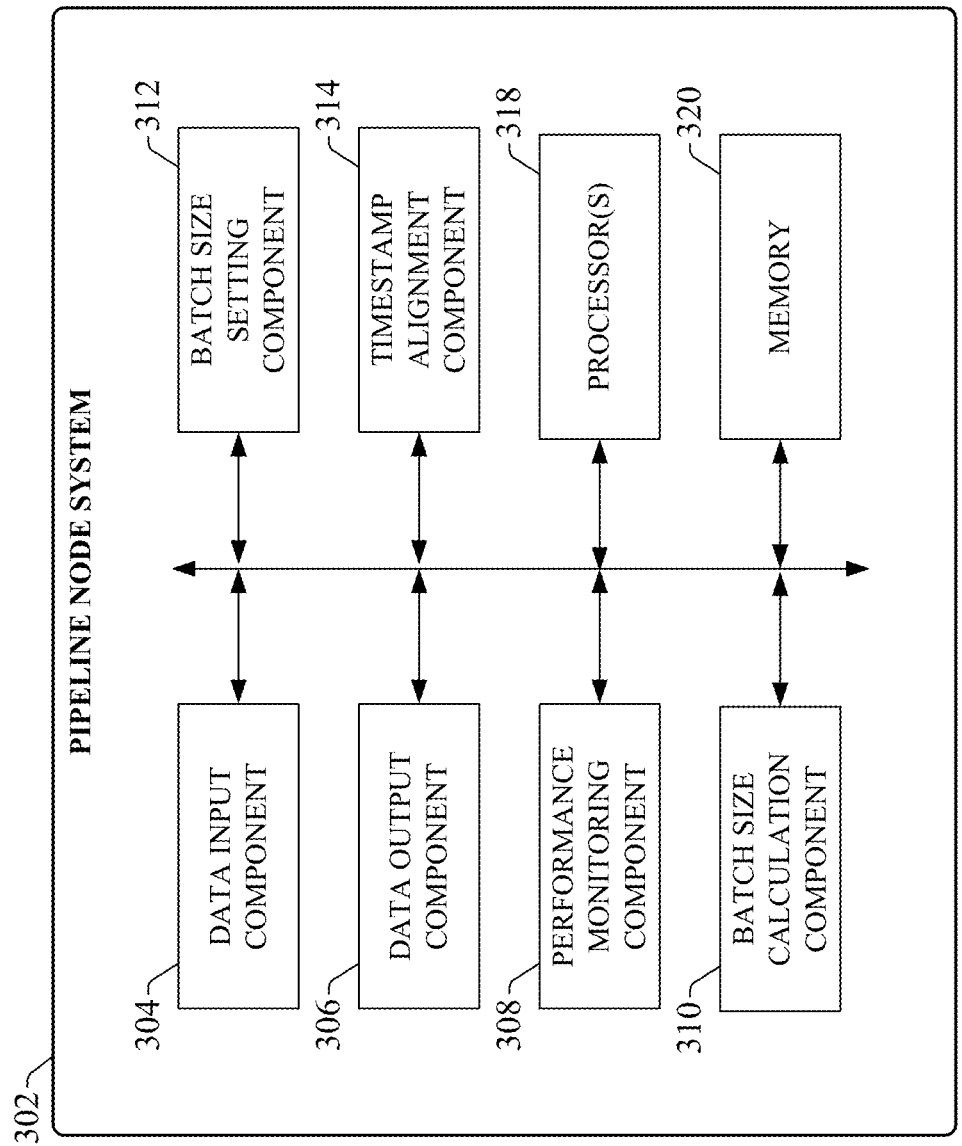
FIG. 3 is a block diagram of an example pipeline node system.

FIG. 3 is a block diagram of an example pipeline node system 302 (also referred to herein simply as a node) according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Node system 302, which can be a node of an IIoT data pipeline having at least some of the functions of nodes 104 described above, can include a data input component 304, a data output component 306, a performance monitoring component 308, a batch size calculation component 310, a batch size setting component 312, a timestamp alignment component 314, one or more processors 318, and memory 320. In various embodiments, one or more of the data input component 304, data output component 306, performance monitoring component 308, batch size calculation component 310, batch size setting component 312, timestamp alignment component 314, the one or more processors 318, and memory 320 can be electrically and/or communicatively coupled to one another to perform one or more of the functions of the node system 302. In some embodiments, components 304, 306, 308, 310, 312, and 314 can comprise software instructions stored on memory 320 and executed by processor(s) 318. Node system 302 may also interact with other hardware and/or software components not depicted in FIG. 3. For example, processor(s) 318 may interact with one or more external user interface devices, such as a keyboard, a mouse, a display monitor, a touchscreen, or other such interface devices.

Data input component 304 can be configured to receive batches of data from an adjacent upstream node system of the data pipeline or from an edge device 106 (if the node system 302 is the first node of a data pipeline). Data output component 306 can be configured to send the received data to an adjacent downstream node system of the data pipeline in data batches. As will be described in more detail herein, the node system 302 can adjust the size of the data batch based on downstream processing performance metrics in order to alleviate data congestion in the event of excessive processing latencies.

Performance monitoring component 308 can be configured to monitor the node system's aggregated processing performance metrics and to report these metrics to an adjacent upstream processing node system. These processing metrics convey the node system's current processing latencies so that the upstream node can set the size its next outgoing data batch based on the node system's current processing capacity. In some embodiments, the performance monitoring component 308 can send the performance metric data via the same data pipeline channel as that used to received data at the data input component 304. Alternatively, the performance monitoring component 308 may send this performance metrics via a separate dedicated channel.

The batch size calculation component 310 can be configured to calculate a size for the next data batch to be sent to an adjacent downstream node based on processing performance metric data received by the downstream node. The batch size setting component 312 can be configured to instruct the data output component 306 to output the next batch of data in accordance with the batch size calculated by the batch size calculation component 310.

The timestamp alignment component 314 can be configured to control a timing of release of the next data batch based on a comparison of the timestamps associated with the oldest data currently queued on the node system 302 with a timestamp reference generated by a timestamp moderator agent.

The one or more processors 318 can perform one or more of the functions described herein with reference to the systems and/or methods disclosed. Memory 320 can be a computer-readable storage medium storing computer-executable instructions and/or information for performing the functions described herein with reference to the systems and/or methods disclosed.

Figure 4:
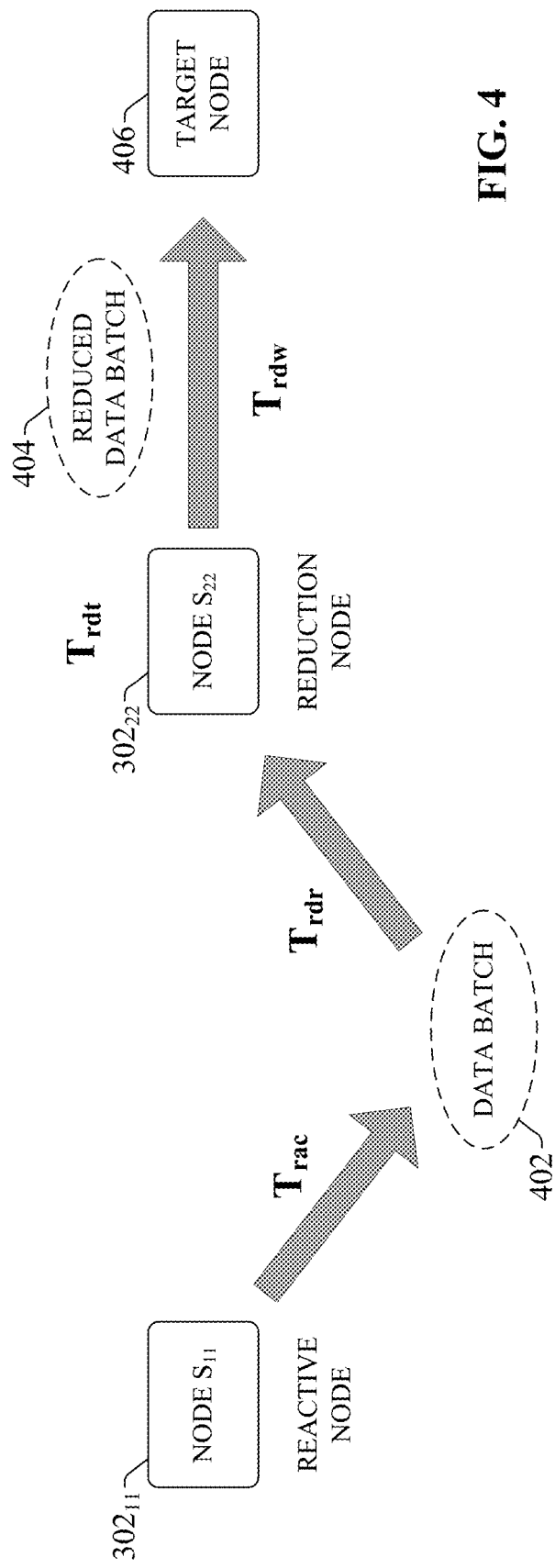
FIG. 4 is a diagram illustrating data processing latencies involved in moving data across nodes of a IIoT data pipeline.

FIG. 4 is a diagram illustrating data processing latencies involved in moving data across nodes of an IIoT data pipeline. In this example, pipeline node systems $302_{11}$ and $302_{22}$ are two adjacent nodes of an example IIoT data pipeline. When data is being sent from a node (i.e., node system 302) of a data pipeline to an adjacent downstream node, the node that is sending the data—e.g., node system $S_{11}$ in FIG. 4—is referred to as the reactive node, while the node that receives and acts on the data—e.g., node system $S_{22}$—is referred to as the reduction node. Since nodes that are not at the extreme ends of the pipeline will both receive data from adjacent upstream nodes and send data to adjacent downstream nodes, these nodes act as both reactive and reduction nodes at various stages of their operation within a given data transmission cycle. FIG. 4 also depicts a target node 406, which is adjacent to and downstream from the reduction node $S_{22}$. Target node 406 may be either another node system 302 of the pipeline, or a final storage destination for the data (e.g., a cloud-based storage node). As noted above, node systems 302 may be servers, microservices, or other processing elements that form the backbone of the IIoT data pipeline.

In-motion data moves from node to node in micro-batches, or data batches. Typically, the size of these micro-batches is fixed. However, to address the data congestion issues discussed above, the reactive node system $302_{11}$ ($S_{11}$) described herein is capable of dynamically adjusting the size of its outgoing data batches 402 based on the processing latency experienced at the adjacent reduction node system $302_{22}$ ($S_{22}$). The processing latency at the reduction node system $302_{22}$ can be characterized by a set of time variables that quantify the times required to perform various tasks associated with processing and moving the data.

For example, $T_{rac}$ represents the time required for the reactive node system $302_{11}$ to collect the data that is to be included in the data batch 402 from an adjacent upstream data source (e.g., an upstream reactive node, one or more IIoT industrial devices, or an edge device 106). In general, this time to collect the data can be given as the product of the size $N_S$ of the incoming data batch and the time $T_u$ required for the reactive node system $302_{11}$ to collect a record for a single data tag of the batch:

$$T_{rac} = N_s * T_u \qquad (1)$$

The time required for the reduction node system $302_{22}$ to read the data batch 402 from the reactive node system $302_{11}$ is given by $T_{rdr}$. Upon reading the data batch 402, the reduction node system $302_{22}$ may apply processing to transform the data contained in the data batch 402. In some applications this transformation may include applying data reduction processing to the data in order to reduce the data set; e.g., by detecting and removing anomalous data or outlier data, or by applying another type of filtering algorithm. In some scenarios, the reduction node system $302_{22}$ may process the incoming data batch 402 according to a node-specific application that executes on the node system (e.g., a notification application, an analytic application, etc.). The time required for the reduction node system $302_{22}$ to reduce, process, or otherwise transform the data is given by $T_{rdt}$. The time required for the reduction node system $302_{22}$ to then write the resulting reduced data batch 404 to the target node 406 is represented by $T_{rdw}$. The total time $T_{rd}$ required for the reduction node system $302_{22}$ to receive, process, and send the incoming data batch 402 can thus be given as $$T_{rd} = T_{rdr} + T_{rdt} + T_{rdw} \qquad (2)$$

The performance metrics for the reactive node system $302_{22}$ at a given time can be represented, in part, in terms of the latencies represented by equation (2), which represent the latencies associated with processing tasks performed by the reactive node system $302_{22}$ itself in connection with receiving, processing, and sending the data. In general, the latency experienced at a given node system 302 is a function of the node's compute power, the network bandwidth, the complexity of the application applied to the data by the node, and the volume of data passing through node. Additionally, the total latency experienced by a given reactive node system $302_{22}$ may also be a function of the latencies experienced by any adjacent downstream nodes. That is, since the data processing latency of a downstream node can propagate to upstream nodes in a cumulative manner, the cumulative latency associated with a given reactive node system $302_{22}$ is a function of both the inherent processing latencies of the node as well as downstream latencies that impact the ability of the reactive node system $302_{22}$ to send its data batch to the next downstream node.

Figure 5:
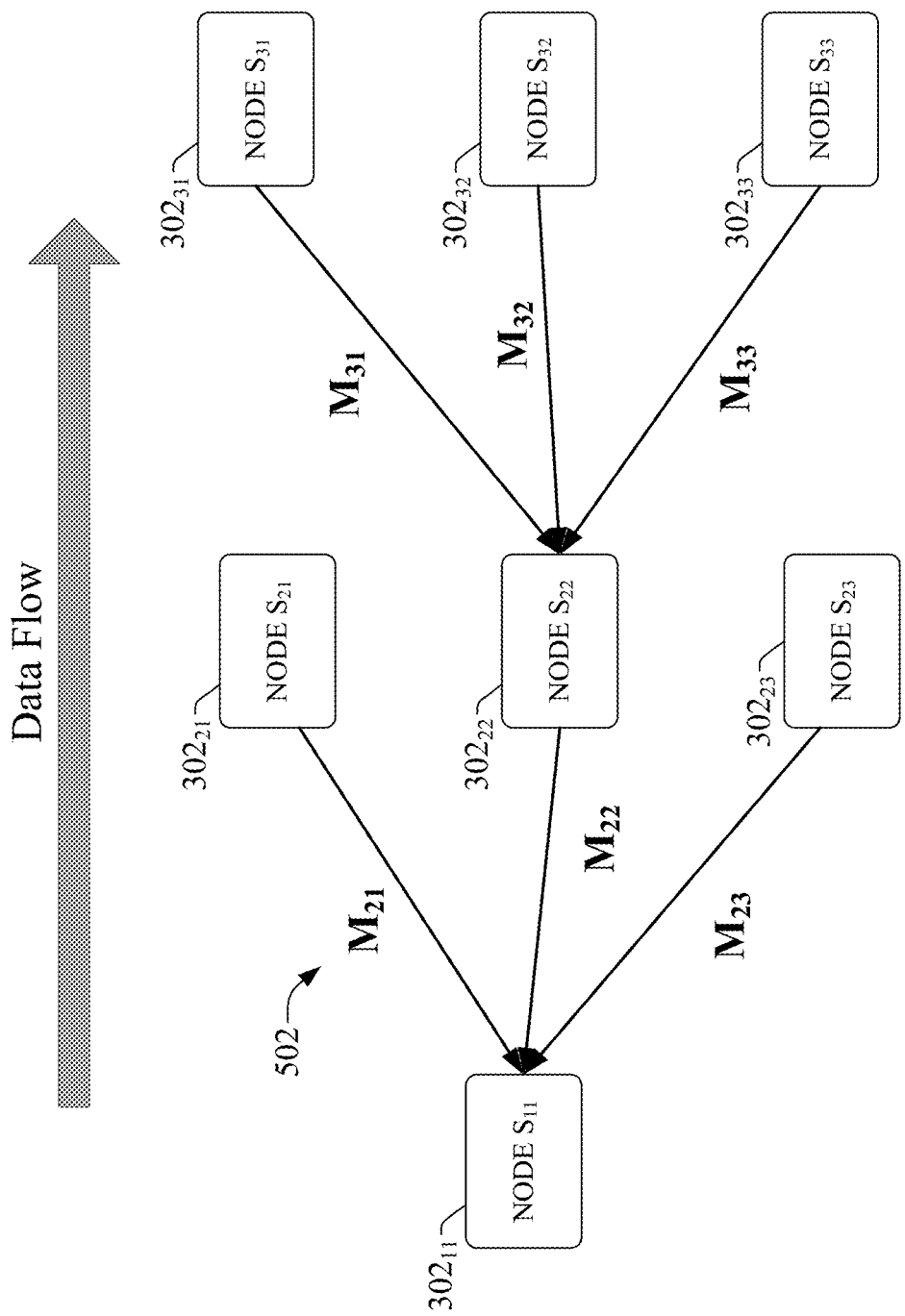
FIG. 5 is a diagram illustrating a network of node systems that make up a portion of one or more IIoT data pipelines.

FIG. 5 is a diagram illustrating a network of node systems 302 that make up a portion of a parallel data pipeline architecture. Although the flow of industrial data through these data pipelines is in the left-to-right (downstream) direction in FIG. 5, embodiments of the node systems 302 described herein can report their measured cumulative performance metrics $M_{ij}$ (as measured by the performance monitoring component 308 of each node system 302) to adjacent upstream node systems 302 by back-propagating this performance metric information in the right-to-left (upstream) direction. That is, in addition to conveying data batches 402 in the downstream direction toward the destination node (e.g., cloud storage or another destination), node systems 302 can also send performance metric data 502 in the upstream direction to adjacent upstream nodes in a recursive manner. This performance metric data 502 can be sent over a same bidirectional data channel as the batch data in some embodiments. Alternatively, in some embodiments the performance metric data can be sent over a separate channel from that used to propagate the batch data. As will be discussed in more detail below, reactive nodes use the cumulative performance metrics $M_{ij}$ reported by their adjacent downstream reduction nodes—representing downstream processing latencies—to calculate an appropriate data batch size for a next data batch transmission, so that the reactive node can deliver its data batch to a downstream reduction node in accordance with the downstream node's current processing capacities.

In the example depicted in FIG. 5, $S_{ij}$ denotes a node (a reactive or reduction node), while $M_{ij}$ denotes the performance metric of a reduction node $S_{ij}$ (e.g., node $S_{22}$) that is to be communicated to an adjacent upstream reactive node $S_{(i-1)k}$ (e.g., node $S_{11}$). Performance metric $M_{ij}$ represents only the local processing latency (given by equation (2)

above) of node $S_{ij}$, and does not include cumulative latencies of nodes that are downstream relative to node $S_{ij}$. That is, local processing latency for a node is given as:

$$M_{ij} = T_{rdr} + T_{rdt} + T_{rdw} \qquad (3)$$

In a parallel pipeline architecture, a given node system 302 may have multiple adjacent downstream nodes and/or multiple adjacent upstream nodes. In the example depicted in FIG. 5, node $S_{11}$ is connected to multiple adjacent downstream nodes $S_{21}$, $S_{22}$, and $S_{23}$, while node $S_{22}$ is itself connected to multiple adjacent downstream nodes $S_{31}$, $S_{32}$, and $S_{33}$. To ensure that a reactive node $S_{ij}$ sets the size of its outgoing data batch directed to a reduction node $S_{kn}$ in a manner that takes into account current downstream processing capacity, the reactive node $S_{ij}$ considers both the local processing latency of the target reduction node $S_{kn}$ itself, as well as the cumulative processing latencies of nodes that are downstream relative to the reduction node $S_{kn}$, since these downstream latencies can impact the total latency experienced at the target reduction node $S_{kn}$.

In general, a reactive node $S_{ij}$ can calculate a node cumulative performance metric (or cumulative processing latency) $CL_{ij,kn}$ for the purposes of transmitting a data batch to an adjacent reduction node $S_{kn}$ as a sum of the local performance metric (e.g., processing latency) $M_{kn}$ of the target reduction node $S_{kn}$, the maximum of the performance metrics ($M_{k+1,1}$, $M_{k+1,2}$, $M_{k+1,3}$, ...) of any downstream nodes ($S_{k+1,1}$, $S_{k+1,2}$, $S_{k+1,3}$, ...) that are immediately adjacent to the target reduction node $S_{kn}$, the maximum of the performance metrics ($M_{k+2,1}$, $M_{k+2,2}$, $M_{k+2,3}$, ...) of any further downstream nodes ($S_{k+2,1}$, $S_{k+2,2}$, $S_{k+2,3}$, ...) that are immediately adjacent to these adjacent nodes, and so on through the data pipeline. This can be written as:

$$CL_{ij,kn} = M_{kn} + \Sigma(\max(M_{k+1,1}, M_{k+1,2}, M_{k+1,3}, \ldots), \max(M_{k+2,1}, M_{k+2,2}, M_{k+2,3}, \ldots), \ldots) \qquad (4)$$

In the example pipeline segment depicted in FIG. 5, if nodes $S_{31}$, $S_{32}$, and $S_{33}$ are assumed to be the final nodes in the data pipeline (e.g., nodes that deliver data batches to cloud storage or other end destinations for the data batches), the cumulative performance metrics $CL_{11,22}$ calculated by the reactive node $S_{11}$ for transmission of a data batch to reduction node $S_{22}$ is calculated, per equation (4), as:

$$CL_{11,22} = M_{22} + \max(M_{31}, M_{32}, M_{33}) \qquad (5)$$

Since calculation of this cumulative performance metric $CL_{11,22}$ requires knowledge of the localized performance metrics M of multiple downstream node systems 302 in the pipeline, the node systems 302 can be configured to propagate their performance metric data M to the reactive node in a recursive manner. For example, in the architecture depicted in FIG. 5, nodes $S_{31}$, $S_{32}$, and $S_{33}$ can provide their respective performance metrics $M_{31}$, $M_{32}$, and $M_{33}$ to the reduction node $S_{22}$, which provides these downstream performance metrics to the reactive node S together with its own localized performance metric $M_{22}$ so that the reactive node S can determine the cumulative performance metrics (or cumulative processing latency) $CL_{11,22}$ based on these performance metric values using equation (4) (or a variation thereof). To this end, as part of each data transmission cycle for the pipeline as a whole, the performance monitoring component 308 of each node system 302 can measure the local processing latency of its corresponding node system 302 and send this performance metric information M to adjacent upstream node systems 302. Upon receipt of this downstream performance metric information, these adjacent upstream node systems 302 can calculate their respective cumulative performance metrics $CL_{ij,kn}$ based on the received downstream performance metric information in preparation to send their next data batches 402, and can also relay this downstream performance metric information together with their own local performance metric information to their respective adjacent upstream node systems 302.

In some embodiments, the node systems 302 that make up a data pipeline can be configured to send data batches 402 to their adjacent downstream node systems 302 in discrete transmission cycles. In such embodiments, for each data transmission cycle, the node systems 302 can perform an orchestrated handshaking sequence of recursively propagating performance metric data to upstream node systems, calculating cumulative performance metrics at each node system 302 that will be acting as a reactive node (that is, each node system 302 that will be sending a data batch 402 to an adjacent downstream node system 302) based on this propagated performance metric data, setting the sizes of the next data batches 402 that will be sent by each node system 302 for the next data transmission cycle based each node system's calculated cumulative performance metric, and sending their data batches 402 in accordance with the dynamically set batch size. This sequence is described in more detail below.

Figure 6:
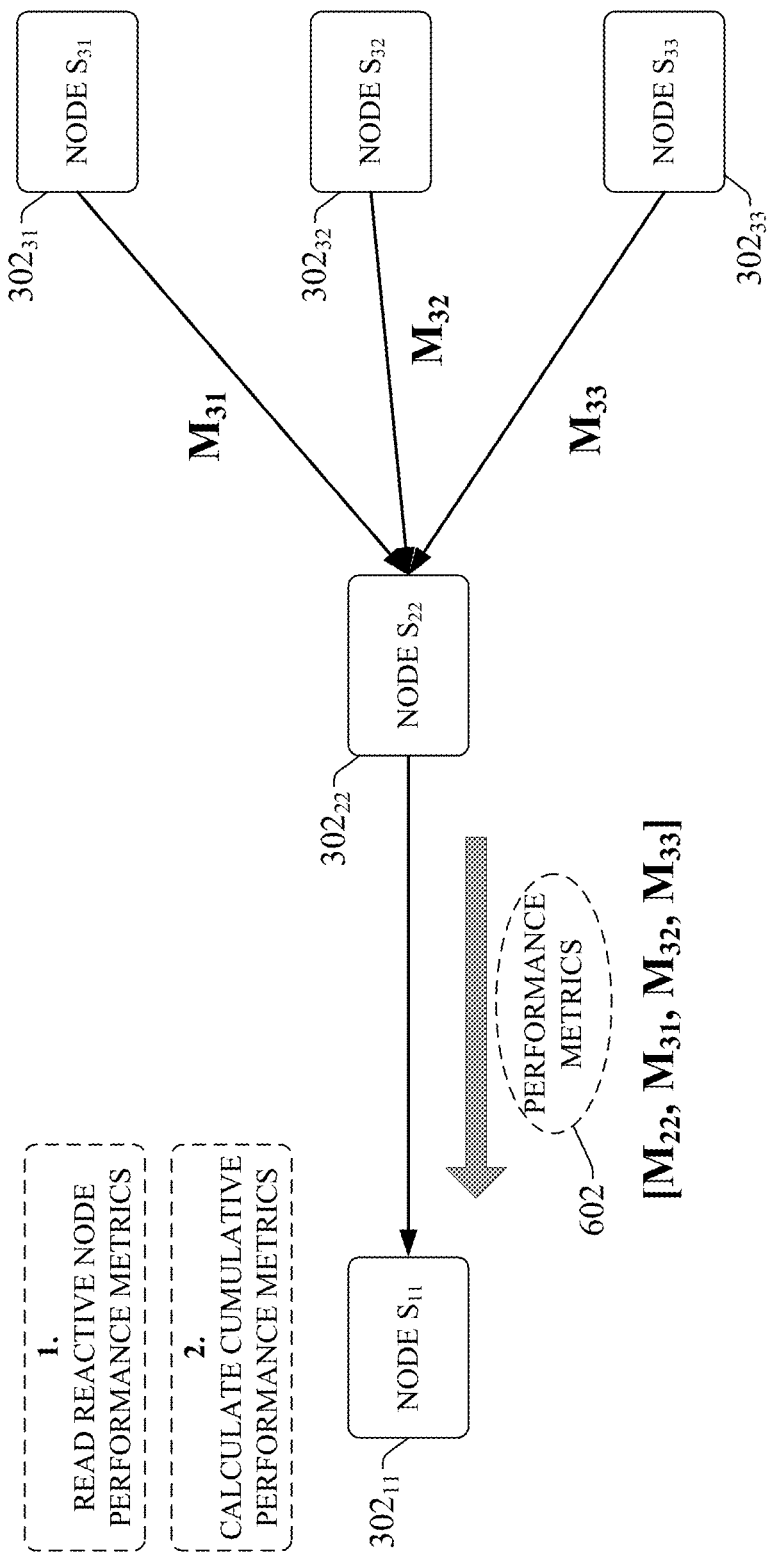
FIG. 6 is a diagram illustrating the first two steps of an example data transmission cycle that can be carried out by one or more embodiments of the data pipeline node systems.
Figure 7:
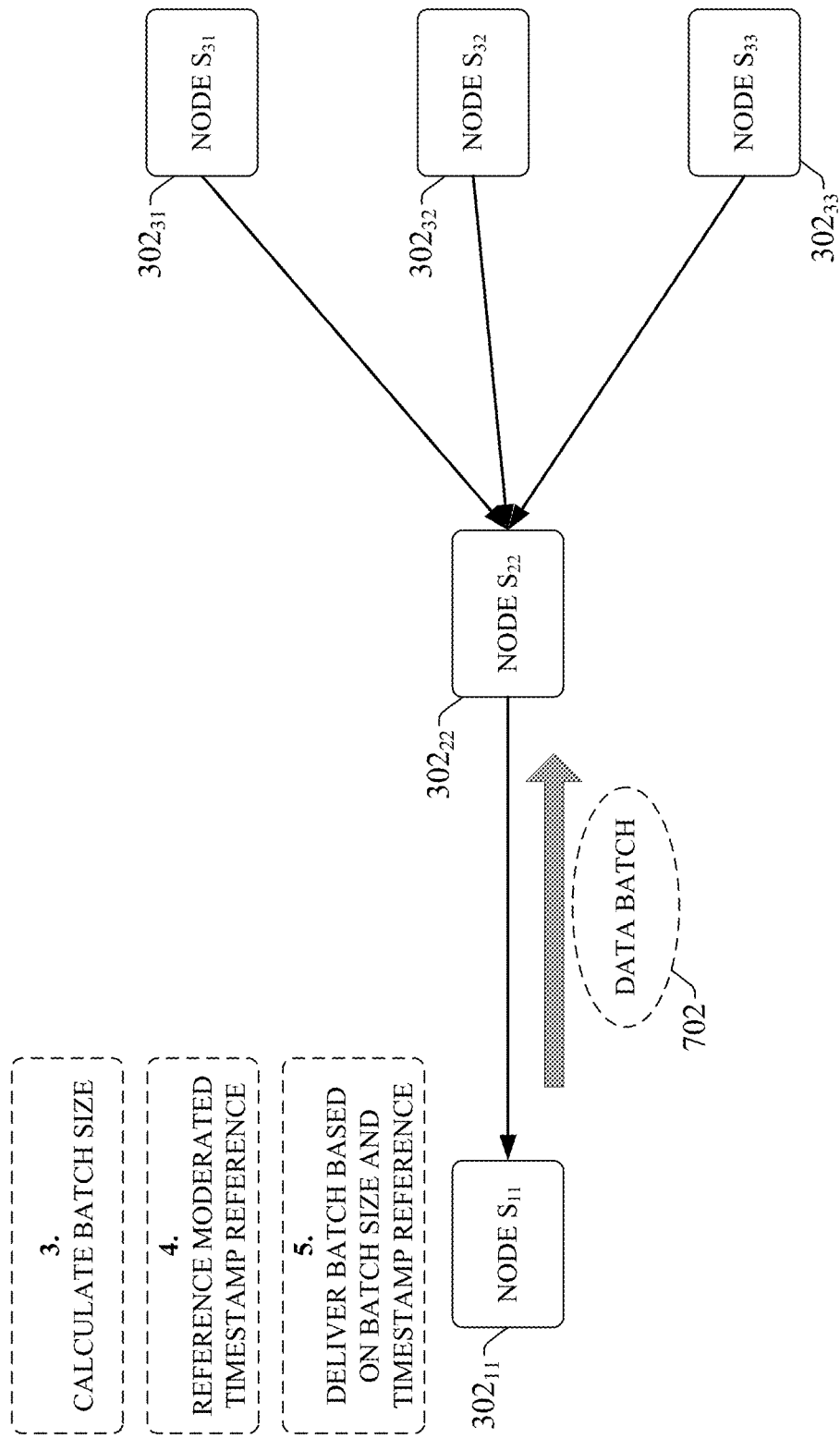
FIG. 7 is a diagram illustrating subsequent three steps of the example data transmission cycle that can be carried out by one or more embodiments of the data pipeline node systems.

FIG. 6 is a diagram illustrating the first two steps of an example data transmission cycle that can be carried out by one or more embodiments of the data pipeline node systems 302. FIG. 7 is a diagram illustrating the subsequent three steps of the transmission cycle. In this example, the steps are described from the perspective of reactive node $S_{11}$. It is to be appreciated, however, that the sequence described herein can be carried out by any of the node systems 302 that will be acting as a reactive node during the transmission cycle (that is, any node that will be sending a data batch 402 to an adjacent downstream node).

In this example, reactive node $S_{11}$ will be sending a data batch to reduction node $S_{22}$, which is itself connected to three further downstream nodes $S_{31}$, $S_{32}$, and $S_{33}$. It is assumed that the reactive node $S_{11}$ has received and stored industrial data (e.g., timeseries data) from an adjacent upstream node of the pipeline (not shown in FIG. 6) or from an edge device that has collected the data from data tags of one or more plant-floor industrial devices and fed this collected data to the pipeline. As a general batch size optimization strategy, the reactive node $S_{11}$ will calculate a cumulative downstream processing latency based on the processing metric information received from the reduction node, as discussed above, and set the size of the next outgoing data batch based on this cumulative processing latency in view of a specified desired or expected latency DL. In some scenarios, this desired latency DL can be predefined by a user (e.g., an administrator of the data pipeline) as an expected latency that will be experienced under normal operating circumstances, which may be a function of such factors as a volume of data being collected from the industrial devices, the rate at which the data is collected, the lengths of the data pipelines, overhead associated with the cloud-based application or service that will be consuming the data (e.g., a visualization application, an analytics application, a reporting application, a control application, etc.), or other such factors. Alternatively, a machine learning system can be used in some configurations to monitor performance of the data pipelines over time and dynamically infer a latency DL can be expected under normal operation conditions.

As an initial step of the transmission cycle, the reactive node $S_{11}$ reads or receives reactive node performance metric data 602 from its adjacent downstream reduction node $S_{22}$ (step 1 in FIG. 6). As discussed above, this performance metric data 602 comprises the performance metric $M_{22}$ for the reduction node $S_{22}$ itself, as well as performance metrics $M_{31}$, $M_{32}$, and $M_{33}$ received from downstream nodes $S_{31}$, $S_{32}$, and $S_{33}$, which are conveyed to the reactive node Sit by the reduction node $S_{22}$. The various performance metric values are generated by the performance monitoring components 308 of their respective node systems 302.

Figure 8:
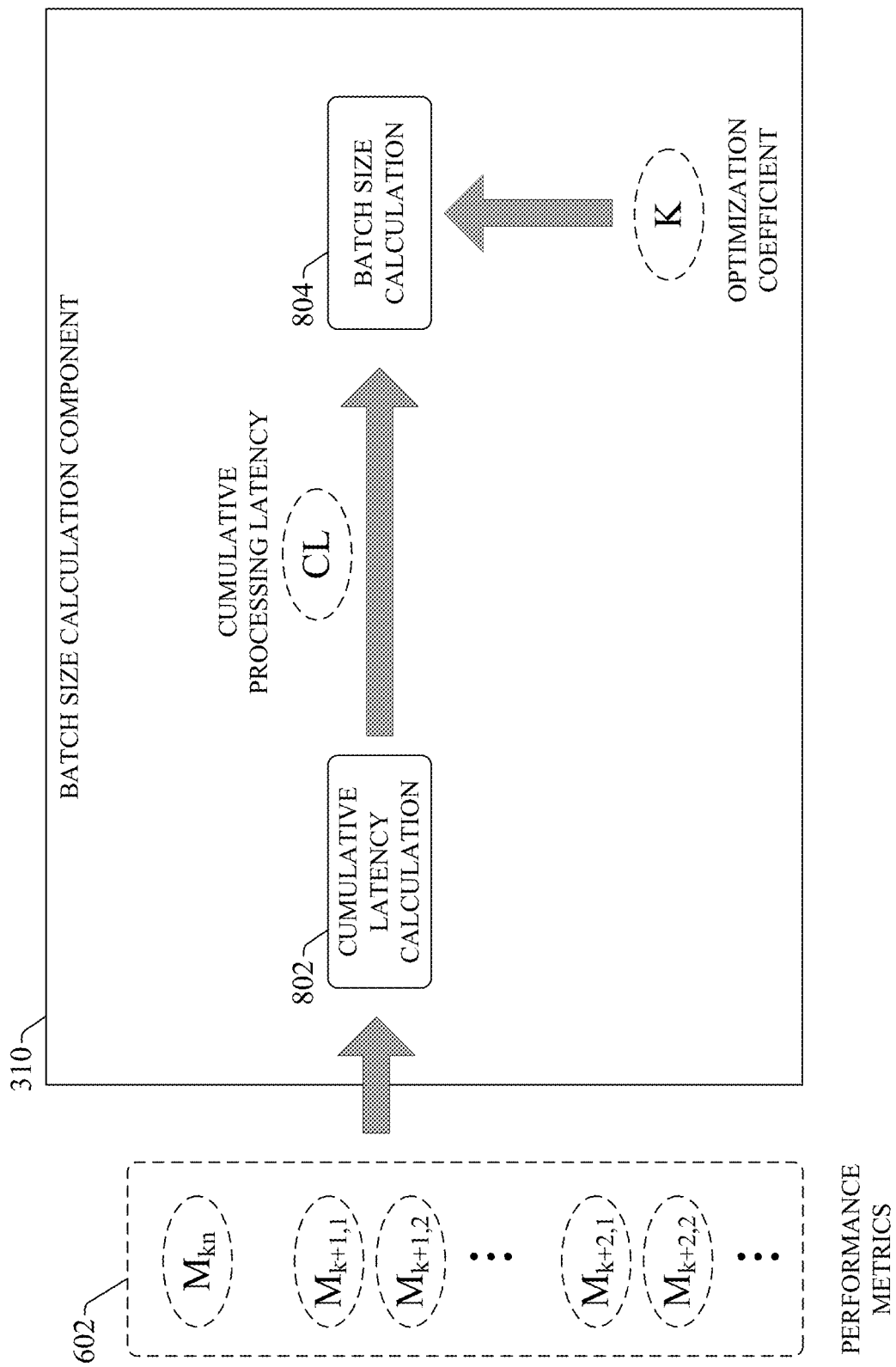
FIG. 8 is a diagram illustrating calculation of the cumulative processing latency.

Upon receipt of the performance metric data 602, the batch size calculation component 310 of reactive node $S_{11}$ calculates a cumulative processing latency CL based on the received performance metric data 602 (step 2 in FIG. 6). FIG. 8 is a diagram illustrating calculation of the cumulative processing latency CL. A cumulative latency calculation block 802 of the batch size calculation component 310 can calculate the cumulative processing latency CL based on the performance metric data 602 received from the reduction node $S_{22}$ according to equation (4) above, or a variation thereof.

Figure 9:
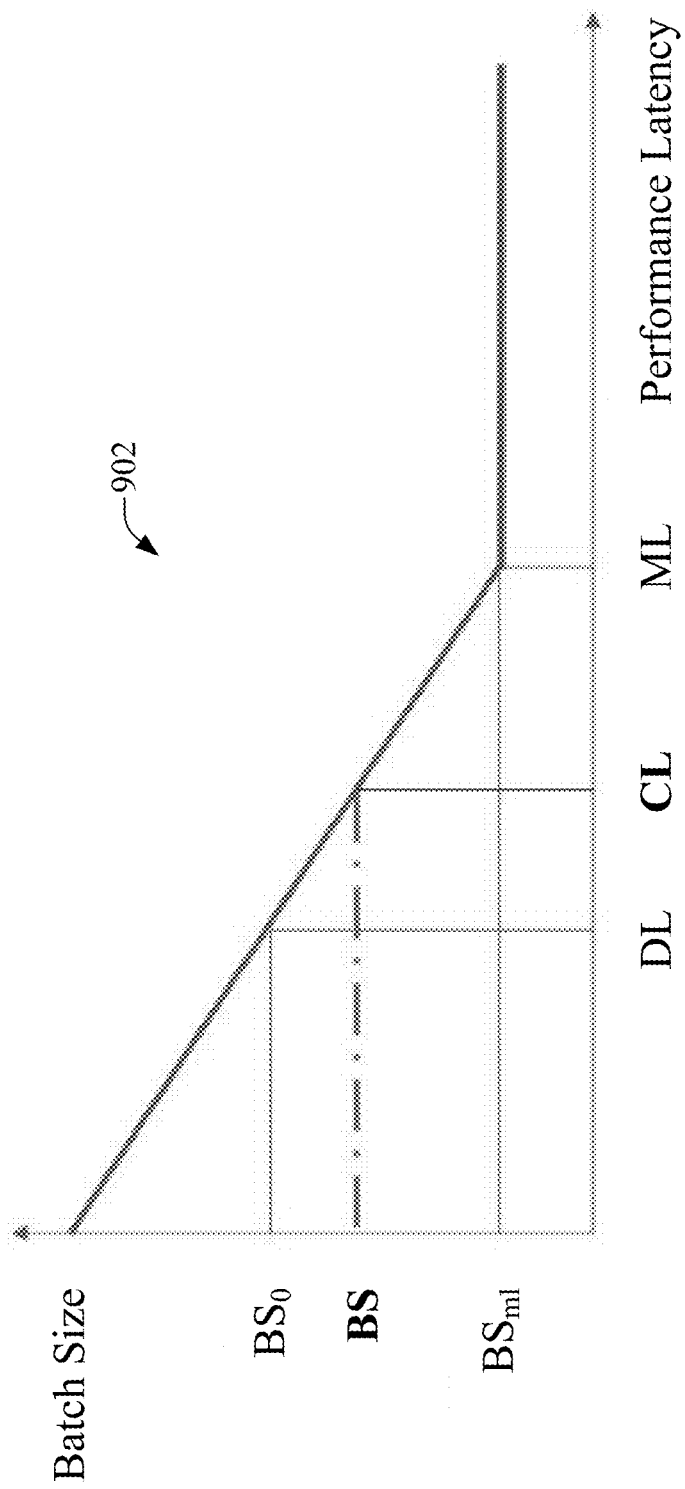
FIG. 9 is a graph representing an example relationship between downstream performance latency relative to a reactive node and a data batch size that is to be set for the reactive node as a function of the downstream latency.

The resulting cumulative processing latency CL is provided to a batch size calculation block 804 of the batch size calculation component 310, together with an optimization coefficient K. In general, the optimization coefficient K represents a predefined relationship between latency and batch size. In the present example, this relationship is assumed to be substantially linear. FIG. 9 is a graph 902 representing an example relationship between downstream performance latency relative to a reactive node and a data batch size that is to be set for the reactive node $S_{11}$ as a function of the downstream latency. As depicted in graph 902, $BS_{ml}$ is a batch size associated with a maximum performance latency ($BS_{ml}$ is also considered the minimum batch size that can be set by the reactive node), $BS_0$ is an initial or default batch size associated with the desired or expected performance latency DL (that is, the batch size $BS_0$ that will typically be set under normal operating conditions when the actual cumulative latency CL is within a defined tolerance of the desired or expected latency DL), and ML is the maximum performance latency. If CL represents the actual cumulative performance latency reported by the reduction node $S_{22}$, then BS is the batch size that is to be set for the next data transmission from the reactive node $S_{11}$ to the reduction node $S_{22}$.

As depicted by graph 902, if performance latency and batch size are plotted on the x-axis and y-axis, respectively, the relationship between the two is defined to be linear with a negative slope. This relationship is based on the understanding that, if the downstream cumulative performance latency CL increases (e.g., due to downstream data bottlenecks, spikes in data volume, etc.), the size of the data batch sent by the reactive node $S_{11}$ should be reduced in order to alleviate the downstream data congestion. Since the relationship between performance latency and batch size is given to be linear in this example, the coefficient K is defined as the slope of this relationship, which can be written as $$K=(BS_{ml}-BS_0)/(ML-DL)<0 \qquad (6)$$

or the difference between the initial batch size $BS_0$ and the batch size $BS_{ml}$ associated with the maximum latency, divided by the difference between the desired or expected latency DL and the maximum latency ML. Since the slope of this relationship is negative, K is less than zero. This optimization coefficient K, as well as the values of $BS_{ml}$, $BS_0$, ML, and DL that were used to compute the coefficient K, can be stored on the reactive node system $302_{11}$ ($S_{11}$) for access by the batch size calculation component 310.

Although graph 902 depicts a linear relationship between batch size and performance latency, in some embodiments this relationship may be defined as a more complicated non-linear relationship. In such embodiments, the formula for coefficient K given by equation (6) can be replaced with an equation that reflects the non-linear relationship.

The desired or expected latency DL can represent an expected cumulative performance latency for the reduction node $S_{22}$ under normal operating conditions given the overall data pipeline application. For example, the expected latency may be a function of the rate at which data is collected from the data tags of the plant-floor industrial devices, the processing capacity of the node $S_{22}$, a processing overhead associated with an application executed by the node $S_{22}$ and applied to the incoming data, or other such factors. In some scenarios, the desired latency DL can be a fixed value that is preset by an administrator to reflect the expected latency for the node system 302. Alternatively, in some embodiments, the desired or expected latency DL can be continuously or periodically re-evaluated and dynamically updated based on measurement and analysis of the node latencies over time. For example, a node system 302 or a higher-level analysis system can monitor the performance latency experienced by the node system 302 and learn an average performance latency of the node system 302 over time. In some embodiments, this monitoring and analysis can be carried out by the performance monitoring component 308 on the node system 302 itself. Alternatively, latency monitoring and analysis can be performed by a separate higher-level analytic system that monitors latencies at respective nodes across the entire data pipeline. In either case, once the average performance latency over time has been learned, the analysis system can dynamically set the expected or desired latency DL based on this learned latency. In an example scenario, based on monitoring and analysis of the latencies at the reactive node $S_{22}$ over time, it may be determined that the reactive node $S_{22}$ can process data faster than initially expected. Based on this assessment, the batch size calculation component 310 can reduce the value of DL accordingly to bring the desired latency in line with the measured expected latency. If the desired latency DL is updated in this manner, batch size calculation component 310 may also update the optimization coefficient K if this new desired latency changes the relationship between latency and batch size.

Figure 10:
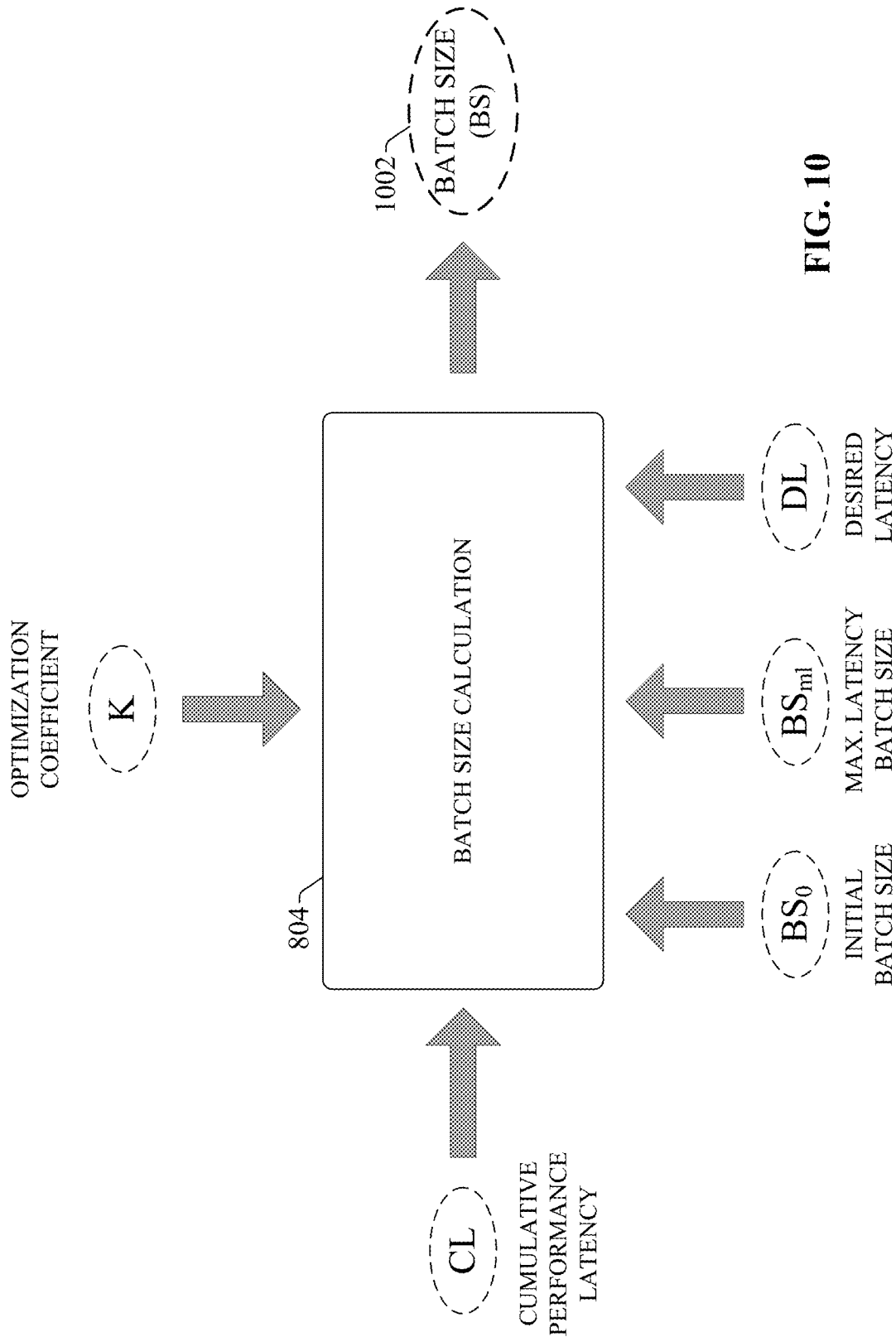
FIG. 10 is a diagram illustrating calculation of a batch size by a batch size calculation block.

Once the batch size calculation component 310 for the reactive node $S_{11}$ has calculated the cumulative performance latency CL based on the downstream performance metric data 602 that was back-propagated by the reduction node $S_{22}$, the batch size calculation block 804 of the batch size calculation component 310 determines a suitable data batch size BS for the next data transmission to the reduction node $S_{22}$ based on the cumulative performance latency CL (step 3 in FIG. 7). FIG. 10 is a diagram illustrating calculation of the batch size BS by the batch size calculation block 804. Given the cumulative performance latency CL reported by the reduction node $S_{22}$ (e.g., as determined based on equation (4) above) and the relationship between latency and batch size represented by coefficient K (as given by equation (6)), the batch size calculation block 804 can calculate a batch size BS according to $$BS=\max\{K(CL-DL)+BS_0, BS_{ml}\} \qquad (7)$$

or a variation thereof. The values of the batch size BS, initial batch size $BS_0$ and maximum latency batch size $BS_{ml}$ can represent any suitable unit of measure for data size, including but not limited to kilobytes, megabytes, gigabytes, or other units.

In this example, the batch size BS is calculated by determining the difference between the cumulative performance latency CL reported by the reduction node $S_{22}$ and the desired or expected latency DL, determining the product of this difference and coefficient K, and adding the initial batch size $BS_0$ associated with the desired or expected latency DL to the resulting product. If this result is greater than the batch size $BS_{ml}$ associated with the maximum latency ML, this result (or an approximation thereof) is taken as the batch size BS for the next data transmission from the reactive node $S_{11}$ to the reduction node $S_{22}$. Alternatively, if the result is less than the batch size $BS_{ml}$, then the next batch size BS is set to be equal to $BS_{ml}$. As shown by equation (7), the batch size BS is determined by offsetting the batch size relative to the initial or default batch size $BS_0$ associated with the expected latency DL, where the amount of the offset is based on the difference between the cumulative performance latency CL and the expected latency DL.

Equation (7) is based on the assumed linear relationship between batch size and performance latency depicted by graph 902. Multiplying the coefficient K—representing the slope of graph 902—with the difference between the reported cumulative latency CL and the desired or expected latency DL yields a corresponding negative difference between the initial or default batch size $BS_0$ and the batch size BS corresponding to the reported cumulative latency CL. Adding the initial or default batch size $BS_0$ to this result yields the batch size BS corresponding to the currently reported cumulative latency CL. This batch size BS is used as the size of the next outgoing data batch sent by the reactive node $S_{11}$ to the reduction node $S_{22}$ if BS is greater than the minimum batch size $BS_{ml}$. If BS is less than the minimum batch size $BS_{ml}$, then $BS_{ml}$ is used as the next outgoing batch size.

As noted above, although equation (7) assumes a linear relationship between latency and batch size as represented by graph 902, some embodiments of the batch size calculation component 310 can replace equation (7) with a formula for batch size that assumes a non-linear relationship between latency and batch size. Such embodiments may be useful for systems in which it is considered preferable to reduce the batch size at an increasing rate as the cumulative latency increases (e.g., an exponential relationship), or to maintain the same batch size for a range of latencies, and only decrease the batch size if the latency exceeds a defined threshold (e.g., an incremental step relationship).

Figure 11:
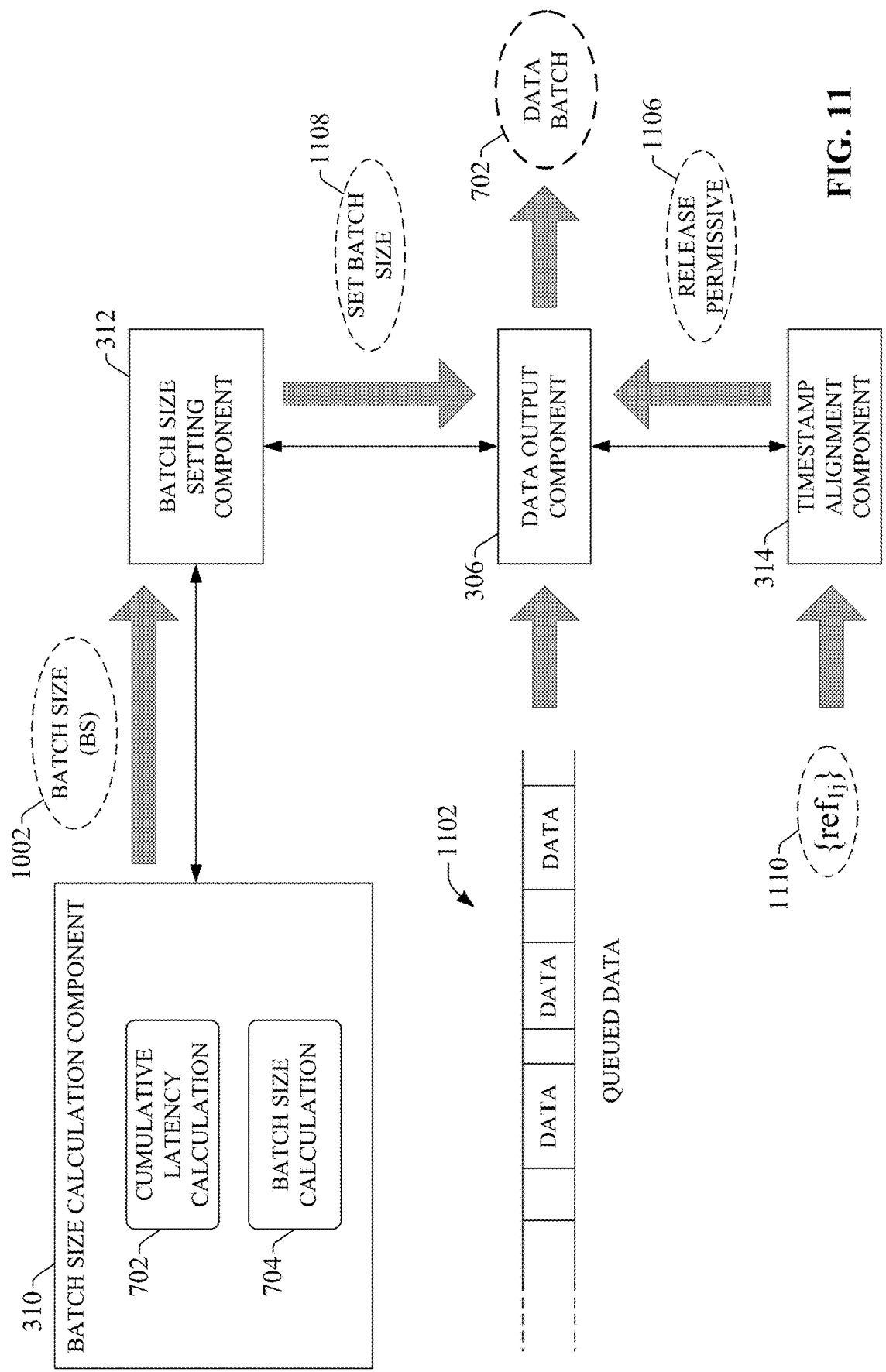
FIG. 11 is a diagram illustrating adjustment of a reactive node's batch size based on results of a batch size calculation.

Once the batch size BS for the next outgoing data batch has been calculated, the reactive node's data output component 306 is reconfigured to output its next data batch in accordance with the calculated batch size BS. FIG. 11 is a diagram illustrating adjustment of the reactive node's batch size based on results of the batch size calculation. At this stage, it is assumed that the reactive node $S_{11}$ stores queued data 1102 that was previously received from an adjacent upstream node (either another node system 302 or an edge device 106) and is waiting to be sent to the reduction node $S_{22}$. Batch size calculation component 310 generates batch size data 1002 identifying the batch size BS that was calculated based on the cumulative performance latency CL reported by the reduction node $S_{22}$, as described above. The batch size calculation component 310 provides this batch size data 1002 to the batch size setting component 312, which provides an instruction 1108 to the data output component 306 to update the size of the next data batch to match the batch size BS reported by the batch size calculation component 310.

In some embodiments, prior to sending out the next batch to the reduction node $S_{22}$, a timestamp alignment component 314 can first refer to time reference data 1110 generated by a timestamp moderator agent and determine, based on this time reference data 1110, whether the next data batch 702 is to be released during the current transmission cycle or delayed until a subsequent transmission cycle (step 4 in FIG. 7). This step will be described in more detail below in connection with FIGS. 12-15b.

Upon receipt of the instruction 1108, the data output component 306 sets the size of its next outgoing data batch 702 to match the batch size BS defined by the instruction 1108 (as calculated by the batch size calculation component 310). Subsequently, when it is time for the reactive node $S_{11}$ to send out its next data batch 702 to the adjacent reactive node $S_{22}$, the data output component 306 adds an amount of the queued data 1102 equal to the batch size BS to the data batch 702 and sends the resulting data batch 702 to the reactive node $S_{22}$ (step 5 in FIG. 7). In some embodiments, the data output component 306 can add the oldest subset of the queued data 1102 to the data batch 702 in a first-in-first-out manner, ensuring that the data that has been waiting in the data queue the longest is given transmission priority over newer data.

In some embodiments, the sequence described above—comprising steps 1-5 depicted in FIGS. 6 and 7 and elaborated in FIGS. 8-11—can be executed for each data transmission cycle of the data pipeline. Alternatively, in some embodiments the steps of back-propagating performance metric data 602, calculating cumulative performance metrics CL at each reactive node, and re-computing a suitable batch size BS may be performed less than every cycle. In the latter case, the batch size may be recalculated on a periodic time basis (e.g., every 30 seconds, every minute, etc.), on the basis of every Nth data transmission cycle (e.g., every $5^{th}$ cycle, every $10^{th}$ cycle, etc.), or in response to a predefined condition (e.g., a determination that latency at one or more node systems 302 has exceeded a defined level, detection of an event that may be indicative of a latency issue, etc.).

Figure 12:
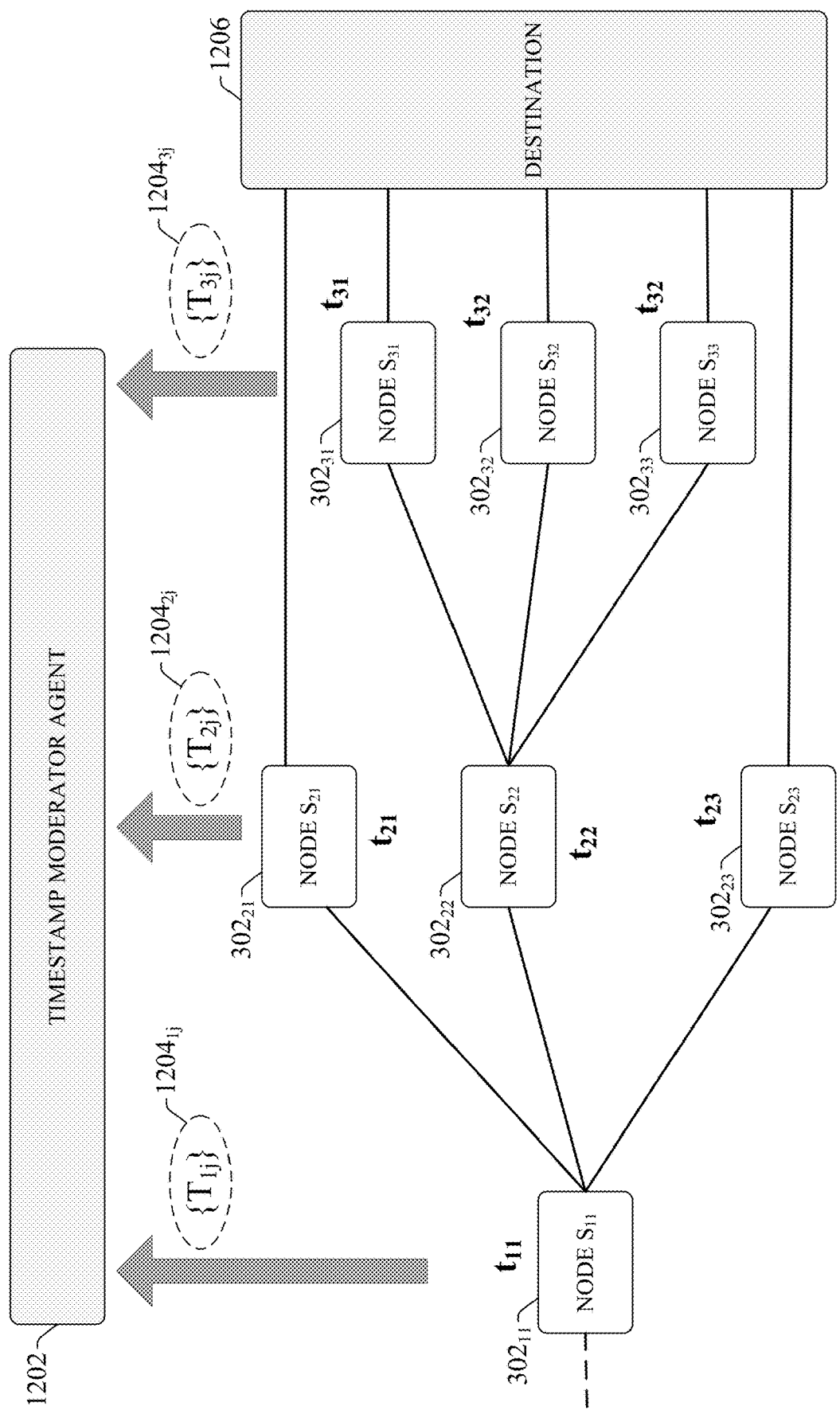
FIG. 12 is a diagram illustrating monitoring of timestamp data by a timestamp moderator agent.
Figure 13:
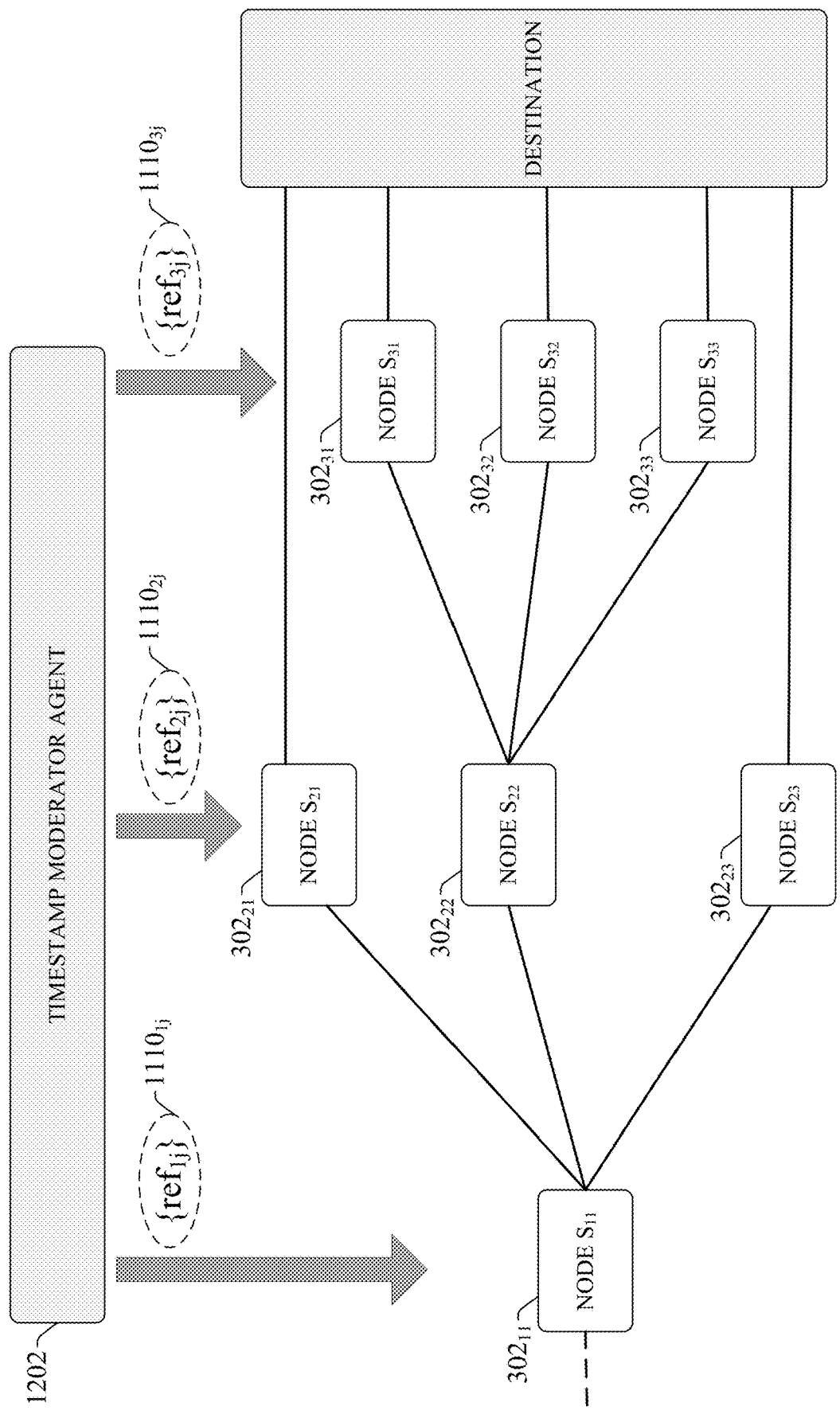
FIG. 13 is a diagram illustrating delivery of layer-specific time references to node systems that make up the data pipelines.

As noted above, some embodiments of the pipeline node system 302 can include a timestamp alignment component 314 that refers to a timestamp reference generated by a timestamp moderator agent prior to sending out the next data batch 702, such that the timing of delivery of the data batch 702 is determined in part by this timestamp reference (step 4 of FIG. 7). This can ensure that queued data stored on the various node systems 302 is delivered to a final destination in a substantially synchronized manner even when some of the data is delayed at one or more of the node systems 302. FIGS. 12 and 13 illustrate this synchronized delivery control approach. In the illustrated example, a number of pipeline node systems 302 are chained together to form multiple parallel data pipelines that deliver industrial data to a target destination 1206. The target destination 1206 may be, for example, a cloud-based application that stores and processes the data received from the pipelines, such as a cloud-based visualization system, an analytic system, a reporting system, or other such applications. In the example architecture depicted in FIG. 12, the chained node systems 302 form five data pipelines of different lengths—a first pipeline through nodes $S_{11}$ and $S_{21}$; a second pipeline through nodes $S_{11}$, $S_{22}$, and $S_{31}$; a third pipeline through nodes $S_{11}$, $S_{22}$, and $S_{32}$; a fourth pipeline through nodes $S_{11}$, $S_{22}$, and $S_{33}$; and a fifth pipeline through nodes $S_{11}$ and $S_{23}$.

The node systems 302 in such an architecture can be categorized according to layer, where a node's layer represents the number of pipeline segments between the node and the edge device (e.g., edge device 106 in FIG. 1, not shown in FIG. 13) from which the industrial data originates. In the illustrated example, node $S_{11}$ is assumed to be the node that receives timestamped industrial data from an edge device (not shown in FIG. 12), and as such is classified as a Layer 1 node. Nodes $S_{21}$, $S_{22}$, and $S_{23}$ are all adjacent to the Layer 1 node $S_{11}$ and are therefore classified as Layer 2 nodes. Any nodes that are adjacent to a Layer 2 node—such as nodes $S_{31}$, $S_{32}$, and $S_{33}$—are classified as Layer 3 nodes. These layer designations are propagated through the entire lengths of the data pipelines.

In many data pipeline applications, items of industrial data entering the pipeline are timestamped to indicate the time at which the data was measured or generated. These timestamps are used by the destination applications to ensure accurate analysis or visualization of the collected data. For example, visualization applications that render the time-series data in a specified format (e.g., as a time-series graph, as a time-based animation, etc.) rely on these timestamps to correctly display the temporal relationships between events on the plant floor. Similarly, analytic applications use the timestamps to accurately identify orders of events or causal relationships between events.

When latencies at one or more node systems 302 result in excessive buffering of data at one or more of the node systems 302, and particularly when these latencies disproportionately affect different pipelines in the chain, time-stamped data from the various data pipelines may be received at the target destination 1206 at different speeds. As a result, the data may not be received at the target destination 1206 in synchronization with the timestamps. That is, one data pipeline that is not experiencing excessive latency may deliver industrial data with a recent timestamp at the same time that a slower pipeline is delivering industrial data with an older timestamp due to latency-related delays. This lack of data synchronization can cause problems with applications at the target destination 1206 that consume this data. For example, visualization of received data values by a visualization application may fall out of synchronization with the timestamps since the data from the various pipelines that feeds this application is arriving at different speeds.

Figure 14:
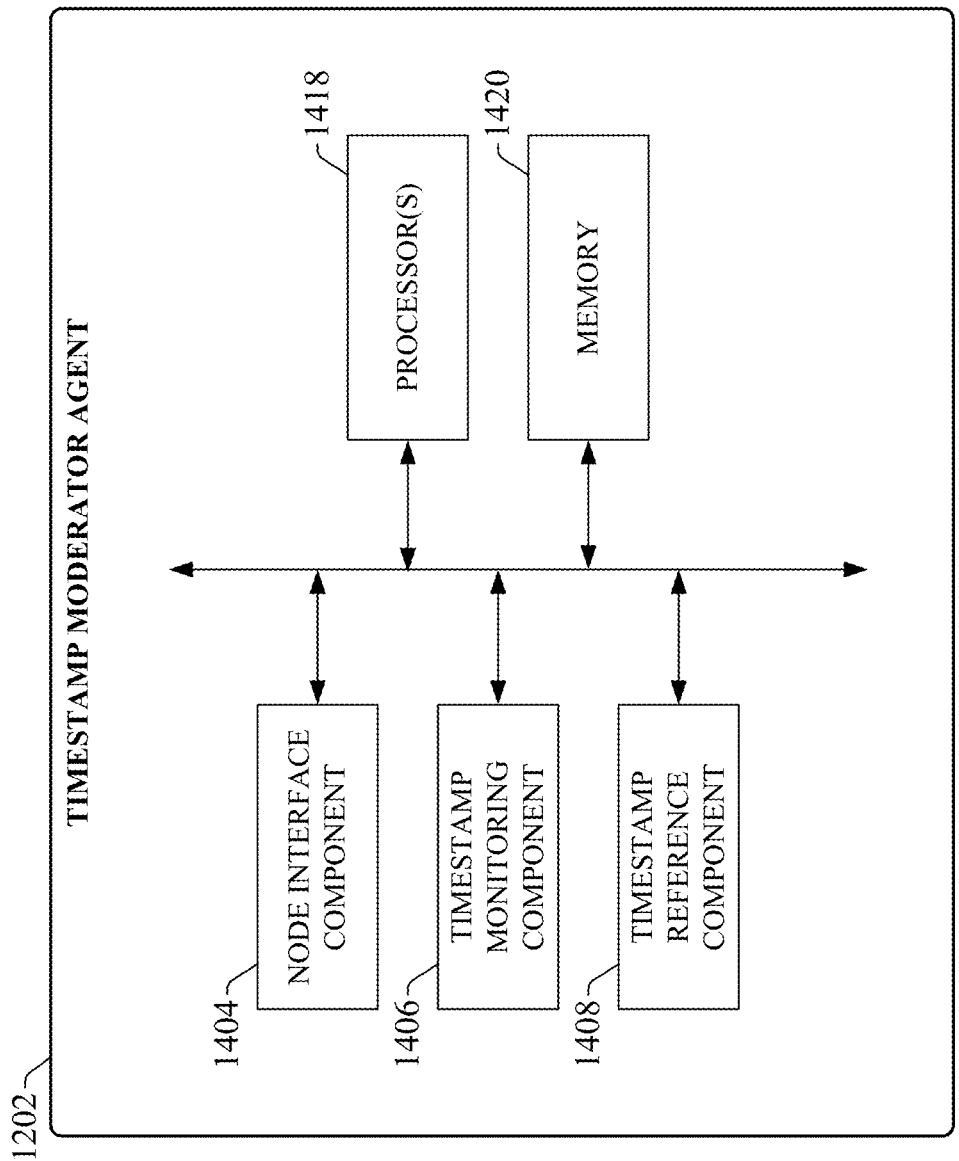
FIG. 14 is a block diagram of an example timestamp moderator agent.

To address this issue, a timestamp moderator agent 1202 can monitor the timestamps of queued data currently stored on the node systems 302 and coordinate delivery of data batches 702 by the nodes of each layer such that data is received at the target destination 1206 in a substantially synchronized manner FIG. 14 is a block diagram of an example timestamp moderator agent 1202 according to one or more embodiments of this disclosure. The timestamp moderator agent 1202 can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Timestamp moderator agent 1202 can include a node interface component 1404, a timestamp monitoring component 1406, a timestamp reference component 1408, one or more processors 1418, and memory 1420. In various embodiments, one or more of the node interface component 1404, timestamp monitoring component 1406, timestamp reference component 1408, the one or more processors 1418, and memory 1420 can be electrically and/or communicatively coupled to one another to perform one or more of the functions of the timestamp moderator agent 1202. In some embodiments, components 1404, 1402, and 1408 can comprise software instructions stored on memory 1420 and executed by processor(s) 1418. Timestamp moderator agent 1202 may also interact with other hardware and/or software components not depicted in FIG. 14. For example, processor(s) 1418 may interact with one or more external user interface devices, such as a keyboard, a mouse, a display monitor, a touchscreen, or other such interface devices.

Node interface component 1404 can be configured to exchange data with pipeline node systems 302 that make up one or more IIoT data pipelines. For example, node interface component 1404 can receive timestamp information indicating the timestamps of oldest data still queued on each node system 302, and deliver layer-specific time reference data to the node systems 302 which informs the nodes whether they should release their next data batch 702 or if delivery of the data batch 702 should be delayed. Timestamp monitoring component 1406 can be configured to monitor the timestamp data received from the node systems 302 together with the node layer from which each item of timestamp data was received. Timestamp reference component 1408 can be configured to generate, for each layer of the pipeline, a time reference that can be used to identify a timestamp or timestamp range that is permitted to be released in a current data transmission cycle. This time reference is generated based on the timestamp data monitored by the timestamp monitoring component 1406.

The one or more processors 1418 can perform one or more of the functions described herein with reference to the systems and/or methods disclosed. Memory 1420 can be a computer-readable storage medium storing computer-executable instructions and/or information for performing the functions described herein with reference to the systems and/or methods disclosed.

FIG. 12 illustrates monitoring of timestamp data 1204 by the timestamp moderator agent 1202. The timestamp data 1204 can be generated by each node's timestamp alignment component 314 and collected by the agent's node interface component 1404. Timestamp data 1204 reported by a node system 302 identifies a timestamp or range of timestamps associated with the oldest data currently queued on the node and awaiting transmission to the next downstream node (or target destination 1206). In some embodiments, timestamp moderator agent 1202 can collect this timestamp data 1204 each data transmission cycle so that the layer-specific time references can be updated each cycle.

The timestamp monitoring component 1406 of the timestamp moderator agent 1202 segregates this timestamp data 1204 according to the node layer from which the timestamp data 1204 was received. For each layer, the timestamp reference component 1408 of the timestamp moderator agent 1202 compares the timestamp data 1204 for the node systems 302 in that layer to identify the oldest queued data reported for the layer. If the timestamp for the oldest queued data in a node system 302 lags significantly behind the timestamps of the data queued in other node systems 302 within the same layer—e.g., due to excessive latency causing the data in the node's pipeline to be propagated at a slower speed relative to the other nodes in the layer—the data traveling through the layer is likely to arrive at the target destination 1206 in a non-synchronous manner if not corrected. That is, data with older timestamps will arrive at the target destination at the same time as data with more recent timestamps.

To address this issue, timestamp moderator agent 1202 can resynchronize the data by permitting the node system 302 with the oldest queued data to release its data batch 702 in the current data transmission cycle while instructing the other nodes in the same layer to delay transmission of their respective data batches 702 until a subsequent transmission cycle. This results in a realignment or substantial realignment of the timestamps of the queued data across all nodes of the layer.

In order to regulate transmission of data batches 702 to maintain alignment of timestamps within each layer, the timestamp moderator agent 1202 can generate and deliver layer-specific time references to each node system 302 based on analysis of the timestamp data 1204. FIG. 13 is a diagram illustrating delivery of layer-specific time references to the node systems 302 that make up the data pipelines. As noted above, the timestamp moderator agent 1202 examines the timestamps associated with the oldest queued data (e.g., queued data 1102 in FIG. 11) stored on each node system 302, as reported by timestamp data 1204. For each layer of the pipeline network, the timestamp moderator agent 1202 identifies, based on this examination, the timestamp corresponding to the oldest queued data among all the node systems 302 within that layer. Unless the timestamps across the nodes 302 of the layer are already substantially synchronized, the oldest timestamp queued within the layer will be reported by a node whose oldest timestamps lag behind the timestamps of the oldest data in the other nodes of the same layer.

Based on results of this determination, the timestamp reference component 1404 generates time reference data 1110 for each layer that makes up the pipeline network. Time reference data 1110 specifies a reference timestamp $\{ref_{ij}\}$ that can be used by each node system 302 in the layer to determine whether the node system 302 will send its data batch 702 in the current data transmission cycle, or will delay transmission of its data batch 702 until a subsequent data transmission cycle. In an example embodiment, the reference timestamp $\{ref_{ij}\}$ for a given layer can indicate the oldest timestamp among the timestamp data 1204 reported by the nodes in that layer. The node interface component 1404 of the timestamp moderator agent 1202 can send this time reference data 1110 to each node system 302 in the layer.

Returning briefly to FIG. 11, the time reference data 1110 is examined by the timestamp alignment component 314 of each node system 302. In general, the timestamp alignment component 314 will issue a release permissive 1106 to the data output component 306 of the node system 302 if the oldest queued data 1102 stored on the node system 302 has a timestamp that matches, or is older than, the reference timestamp $\{ref_{ij}\}$ indicated by time reference data 1110. For the current pipeline transmission cycle, the data output component 306 will only send the data batch 702 during the current cycle if the timestamp alignment component 314 issues the release permissive 1106. Alternatively, if the queued data 1102 only comprises data having timestamps that are more recent than the reference timestamp $\{ref_{ij}\}$ indicated by the time reference data 1110, in excess of a defined lag tolerance, the timestamp alignment component 314 will not issue the release permissive 1106 and the data output component 306 will not send the data batch 702 in the current transmission cycle.

Figure 15A:
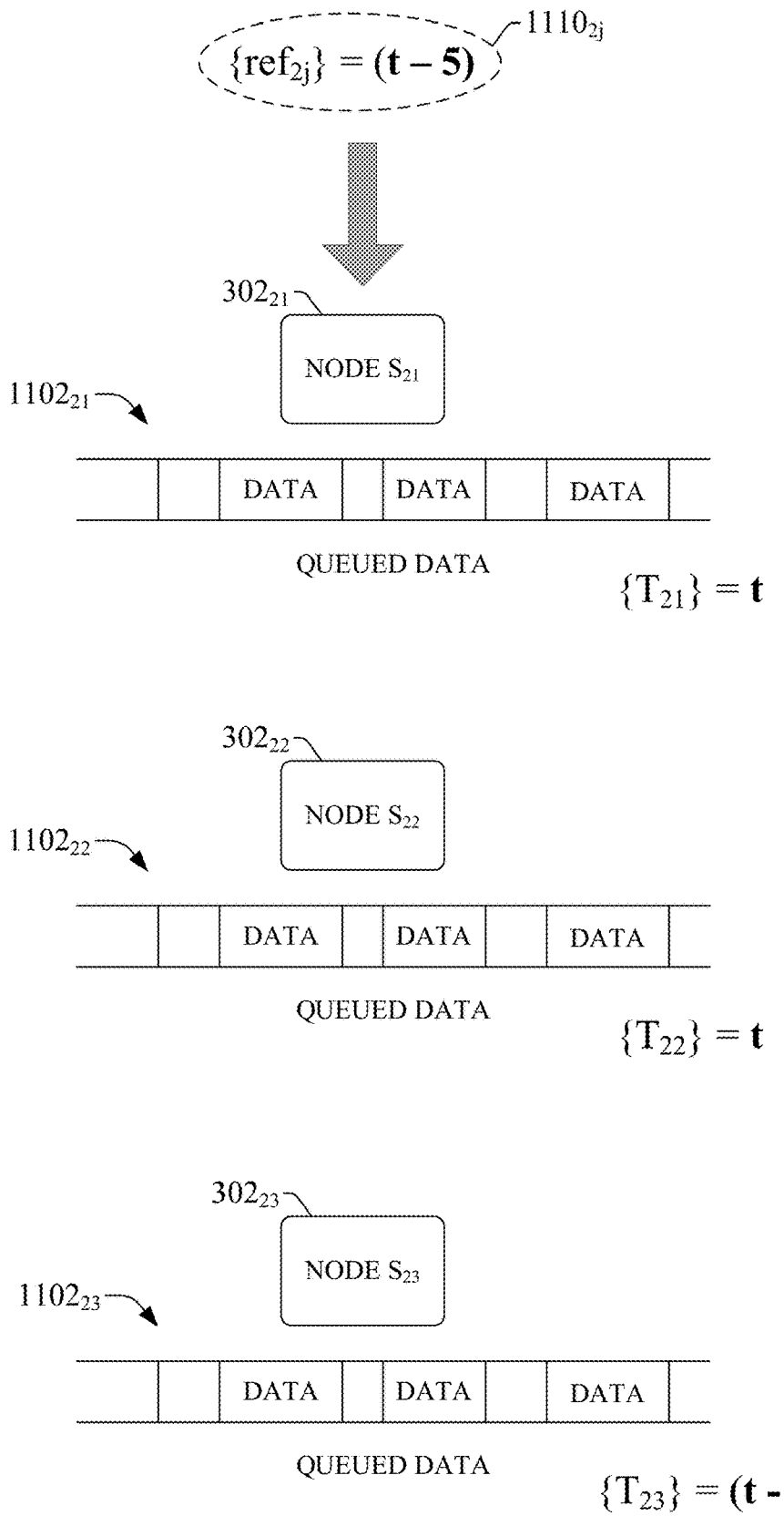
FIG. 15a is a diagram illustrating delivery of a time reference to nodes of a layer of a parallel data pipeline network.
Figure 15B:
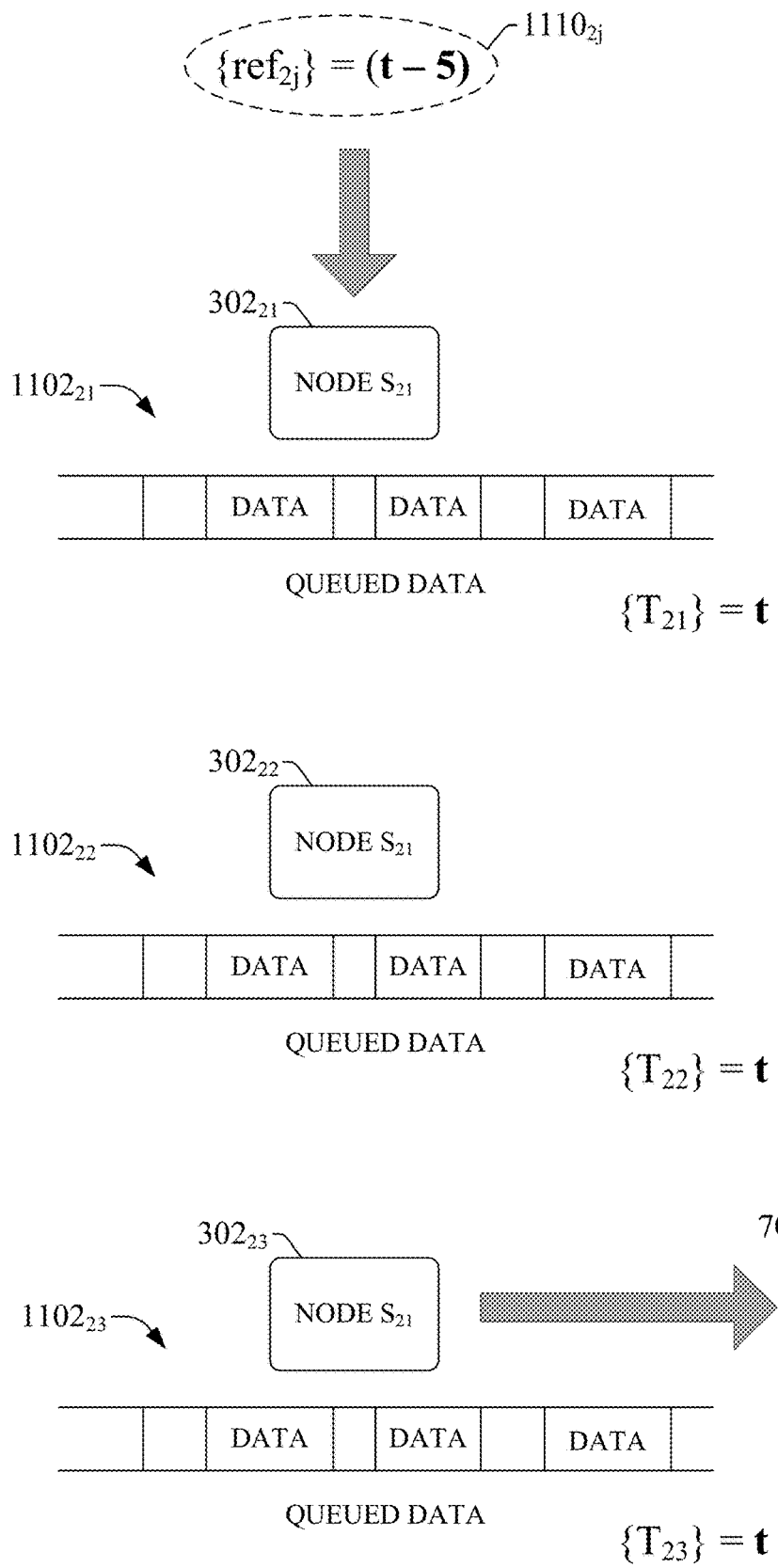
FIG. 15b is a diagram illustrating alignment of time-stamped data within a layer of a parallel data pipeline network by regulating delivery of data batches by nodes of the layer.

FIGS. 15a and 15b illustrate how this approach can bring the timestamped data within a given layer into alignment after the data in one of the node systems 302 begins to lag behind the data in the other node systems 302 in the layer (e.g., due to abnormal latencies experienced by the lagging node). In this example, the nodes in Layer 2 (nodes $S_{21}$, $S_{22}$, and $S_{23}$) store queued data $1102_{21}$, $1102_{22}$, and $1102_{23}$, respectively. Nodes $S_{21}$ and $S_{22}$ have experienced no excessive latency within their associated data pipelines, and as such the timestamps of the oldest data in their data queues $1102_{21}$ and $1102_{22}$ are substantially equal and given as time $T_{2j}=t$. By contrast, the queued data $1102_{23}$ stored on node $S_{23}$ has been released at a slower rate relative to nodes $S_{21}$ and $S_{22}$ due to unexpected downstream latencies, and as a result the timestamp of the oldest data in the queued data $1102_{23}$ lags behind the timestamps of the data in the other queued data $1102_{21}$ and $1102_{22}$. This lagged timestamp is given by $T_{23}=(t-5)$ in this example.

As discussed above in connection with FIG. 12, the node systems 302 report their oldest queued timestamps $T_{2j}$ as timestamp data 1204 to the timestamp moderator agent 1202. The timestamp moderator agent 1202 determines that the timestamp $T_{23}$ reported by node $S_{23}$ is the oldest of the timestamps reported by the nodes of that layer, and therefore issues time reference data $1110_{2j}$ to the nodes of the layer indicating that $\{ref_{2j}\}=(t-5)$ is the current time reference for the layer.

The timestamp alignment component 314 of each node in the layer receives this time reference data $1110_{2j}$ and determines whether to issue the release permissive 1106 to its corresponding data output component 306 based on a comparison between the time reference $\{ref_{2j}\}=(t-5)$ and the timestamp of the oldest data in the node's queued data 1102. As noted above in connection with FIG. 11, the timestamp alignment component 314 will issue the release permissive 1106 if the oldest timestamp in the node's queued data 1102 is equal to or older than the time reference $\{ref_{2j}\}=(t-5)$. The timestamp alignment component 314 may also issue the release permissive 1106 if the oldest timestamp in the node's queued data 1102 is more recent than the $\{ref_{2j}\}=(t-5)$, but the difference between the oldest timestamp and the time reference $\{ref_{2j}\}$ does not exceed a defined lag time. This ensures that data batches 702 are only delayed if the timestamp lag between two or more of the node systems 302 becomes sufficiently large to merit delaying some data queues in order to realign the timestamps.

FIG. 15b is a diagram illustrating selective transmission of a data batch 702 in order to realign the timestamps in the example depicted in FIG. 15a. Nodes $S_{21}$ and $S_{22}$ compare the time reference $\{ref_{2j}\}=(t-5)$ with the timestamps of the oldest data in their respective queued data $1102_{21}$ and $1102_{22}$. Based on a determination that the oldest timestamps in their queued data $1102_{21}$ and $1102_{22}$ exceed the time reference $\{ref_{2j}\}=(t-5)$ in excess of the defined lag time, the timestamp alignment component 314 of nodes $S_{21}$ and $S_{22}$ refrain from issuing a release permissive 1106, and consequently nodes $S_{21}$ and $S_{22}$ do not send their data batches 702 to their adjacent reactive nodes. In contrast, node $S_{23}$ determines that the oldest timestamp in its queued data $1102_{23}$ is equal to or less than the time reference $\{ref_{2j}\}=(t-5)$ and releases its data batch 702 accordingly. Releasing this data batch 702 causes the data that was included in the data batch 702 to be deleted from the queued data $1102_{23}$, and consequently the oldest timestamp in the remaining queued data $1102_{23}$ are shifted forward in time. The amount of this shift depends on the batch size BS of the data batch 702 and the time density of the queued data $1102_{23}$. In the illustrated example, the resulting timestamp shift causes the oldest timestamp on node $S_{23}$ to shift from $T_{23}=(t-5)$ to $T_{23}=t$. Since this timestamp shift occurs only on node $S_{23}$ but not on nodes $S_{21}$ and $S_{22}$— which have delayed transmission of their respective data batches 702 and therefore did not experience a timestamp shift in the present transmission— the timestamps across the three nodes in the layer are brought into alignment. Accordingly, when the time reference $\{ref_{2j}\}$ is updated during the next transmission cycle, all three nodes in the layer will be permitted to transmit their data batches 702, since the oldest timestamps in the three sets of queued data $1102_{21}$, $1102_{22}$, and $1102_{23}$ will satisfy the time reference $\{ref_{2j}\}$.

The use of a timestamp moderator agent 1202 as described above in connection with FIGS. 11-15b can ensure that lagged data within a layer of a parallel pipeline network is delivered before other data in the layer, thereby synchronizing delivery of data to the target destination 1206 via the parallel pipelines even if one or more of the pipelines experiences excessive unexpected latency.

The dynamic IIoT reactive buffering and batch size regulation features described herein offering a mechanism for seamlessly auto regulating the transmission of data between nodes of a data pipeline. This pipeline data flow management does not require application-level control, but rather regulates control based purely on performance and data priority. By establishing an inter-node handshaking sequence in which downstream latency is reported to each node and dynamically adjusting the sizes of outgoing data batches in response to changes in cumulative downstream latency, the system described herein can automatically alleviate data congestion by reducing the size of a node's outgoing data batch when downstream performance latencies increase, thereby preventing the downstream nodes from becoming overwhelmed with data during busy periods.

Node systems 302 having dynamic batch size adjustment features can be used within an architecture that is also regulated by a timestamp moderator agent 1202, as depicted in FIGS. 12 and 13. This combined architecture can both alleviate data congestion and maintain synchronized delivery of data to an end destination even in the event of asymmetric data latencies across different parallel pipelines. However, the timestamp moderator agent 1202 and node systems 302 can also be used independently in some architectures without departing from the scope of one or more embodiments. That is, the timestamp moderator agent 1202 can be used in parallel pipeline architectures that do not support dynamic adjustment of data batch sizes, while the node systems 302 can be used within a data pipeline architecture that is not regulated by a timestamp moderator agent 1202.

FIGS. 16-19 illustrates methodologies in accordance with one or more embodiments of the subject application. While, for purposes of simplicity of explanation, the methodologies shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 16:
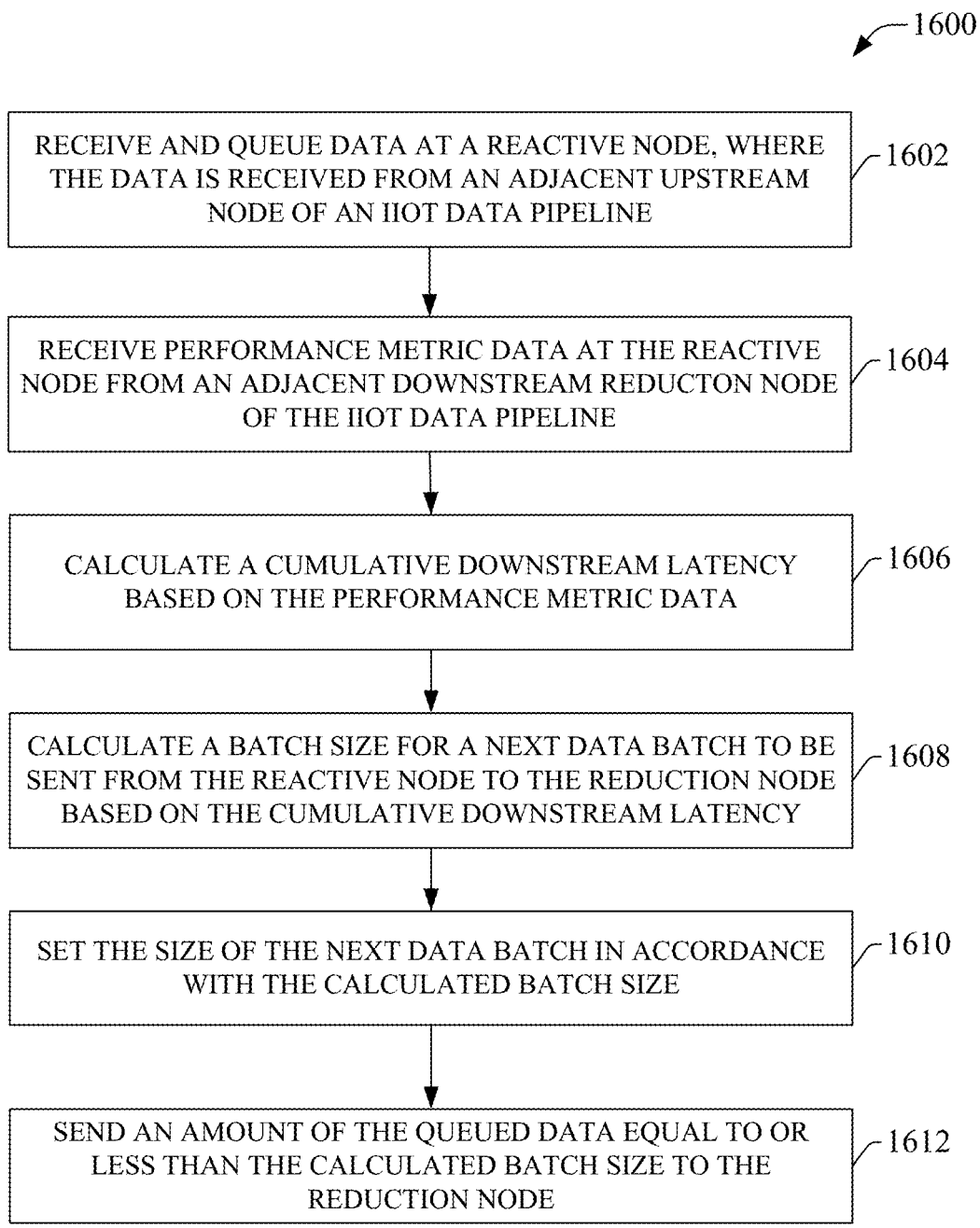
FIG. 16 is a flowchart of an example methodology for regulating a size of a data batch sent by a reactive node of an industrial IIoT data pipeline to an adjacent downstream reactive node.

FIG. 16 illustrates an example methodology 1600 for regulating a size of a data batch sent by a reactive node of an industrial IIoT data pipeline to an adjacent downstream reactive node. The methodology 1600 can be performed for each data transmission cycle of a reactive node of the pipeline. Initially, at 1602, data is received and queued at a reactive node of an IIoT data pipeline. The data can be received from an adjacent upstream node of the pipeline, or from an edge device that collects industrial data from industrial devices and feeds the data to the pipeline. At 1604, performance metric data is received at the reactive node from an adjacent downstream reduction node of the data pipeline. The performance metric data can convey a current processing latency of the reduction node itself, as measured by the reduction node, as well as information regarding processing latencies of nodes that are downstream relative to the reduction node.

At 1606, a cumulative downstream latency is calculated at the reactive node based on the performance metric data received at step 1604. At 1608, a batch size for a next data batch to be sent from the reactive node to the reduction node is calculated based on the cumulative downstream latency calculated at step 1606. At 1610, the size of the next data batch to be sent by the reactive node is set in accordance with the batch size calculated at step 1608. At 1612, an amount of the queued data equal to or less than the calculated batch size is sent to the reduction node.

Figure 17:
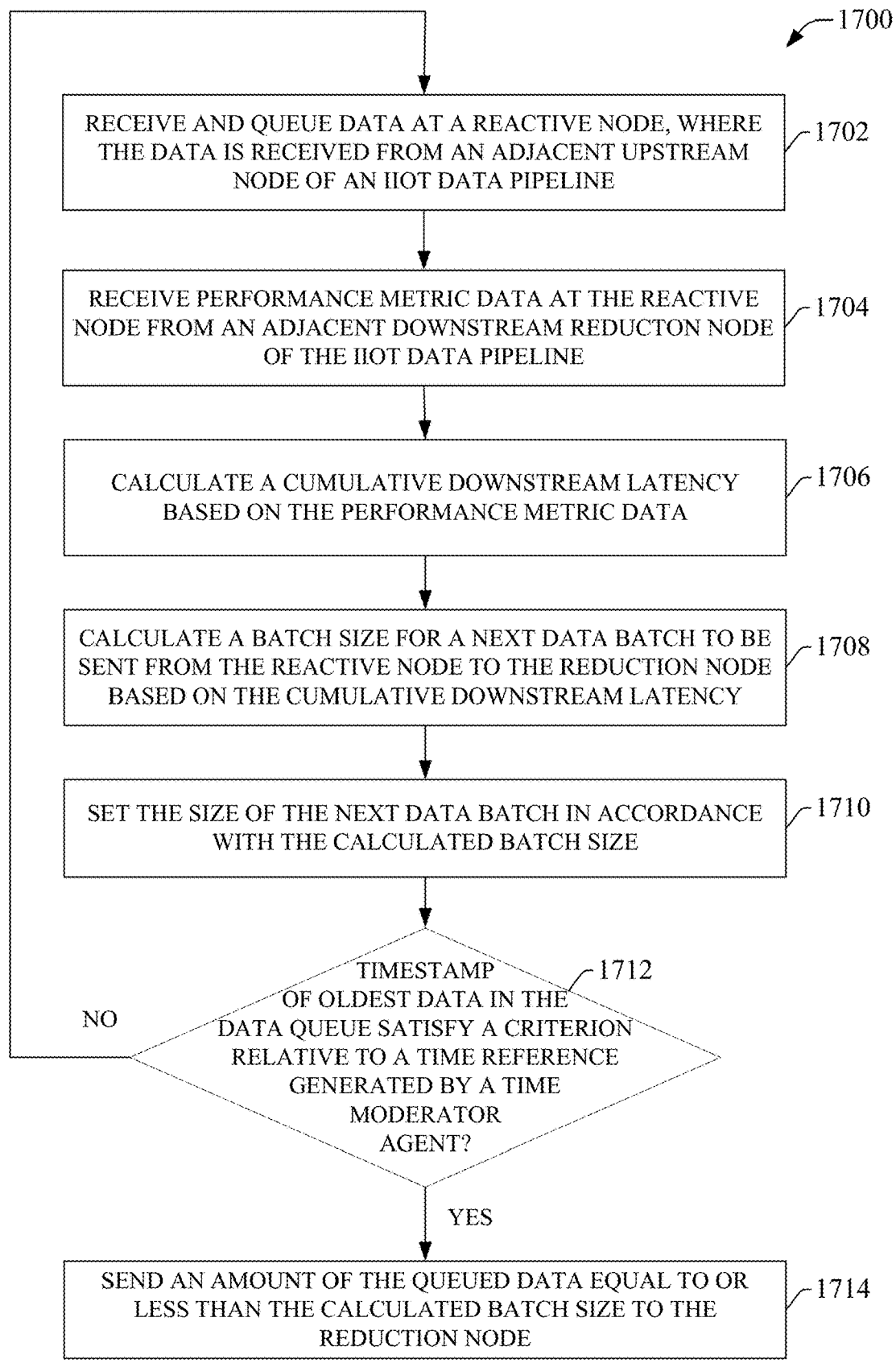
FIG. 17 is a flowchart of an example methodology for both regulating a size of a data batch sent by a reactive node of a parallel data pipeline network to an adjacent downstream reactive node, as well as maintaining synchronization of timestamped data within respective node layers of the parallel data pipeline network.

FIG. 17 illustrates an example methodology 1700 for both regulating a size of a data batch sent by a reactive node of a parallel data pipeline network to an adjacent downstream reactive node, as well as maintaining synchronization of timestamped data within respective node layers of the parallel data pipeline network. Initially, at 1702, data is received and queued at a reactive node from an adjacent upstream node (similar to step 1602 of methodology 1600). At 1704, performance metric data is received at the reactive node from an adjacent downstream reduction node (similar to step 1704 of methodology 1600). At 1706, a cumulative downstream latency is calculated based on this performance metric data (similar to step 1606 of methodology 1600). At 1708, a batch size for the next data batch to be sent by the reactive node is calculated based on the cumulative downstream latency (similar to step 1608 of methodology 1600). At 1710, the size of the next data batch is set in accordance with the batch size calculated at step 1708.

At 1712, a determination is made as to whether a timestamp associated with the oldest data currently queued on the reactive node satisfies a criterion relative to a time reference generated by a time moderator agent. The time reference can specify a timestamp corresponding to the oldest queued data within a node layer in which the reactive node resides. In an example configuration, the timestamp of the oldest data satisfies the criterion if the timestamp is not later than the timestamp indicated by the time reference in excess of a defined lag time. If the timestamp of the oldest data in the data queue satisfies the criterion (YES at step 1712), the methodology proceeds to step 1714, where an amount of the queued data equal to or less than the calculated batch size is sent form the reaction node to the reduction node (similar to step 1612 of methodology 1600). Alternatively, if the timestamp of the oldest data in the data queue does not satisfy the criterion (NO at step 1712), the data batch is not sent and the methodology returns to step 1702 for the next transmission cycle.

Figure 18:
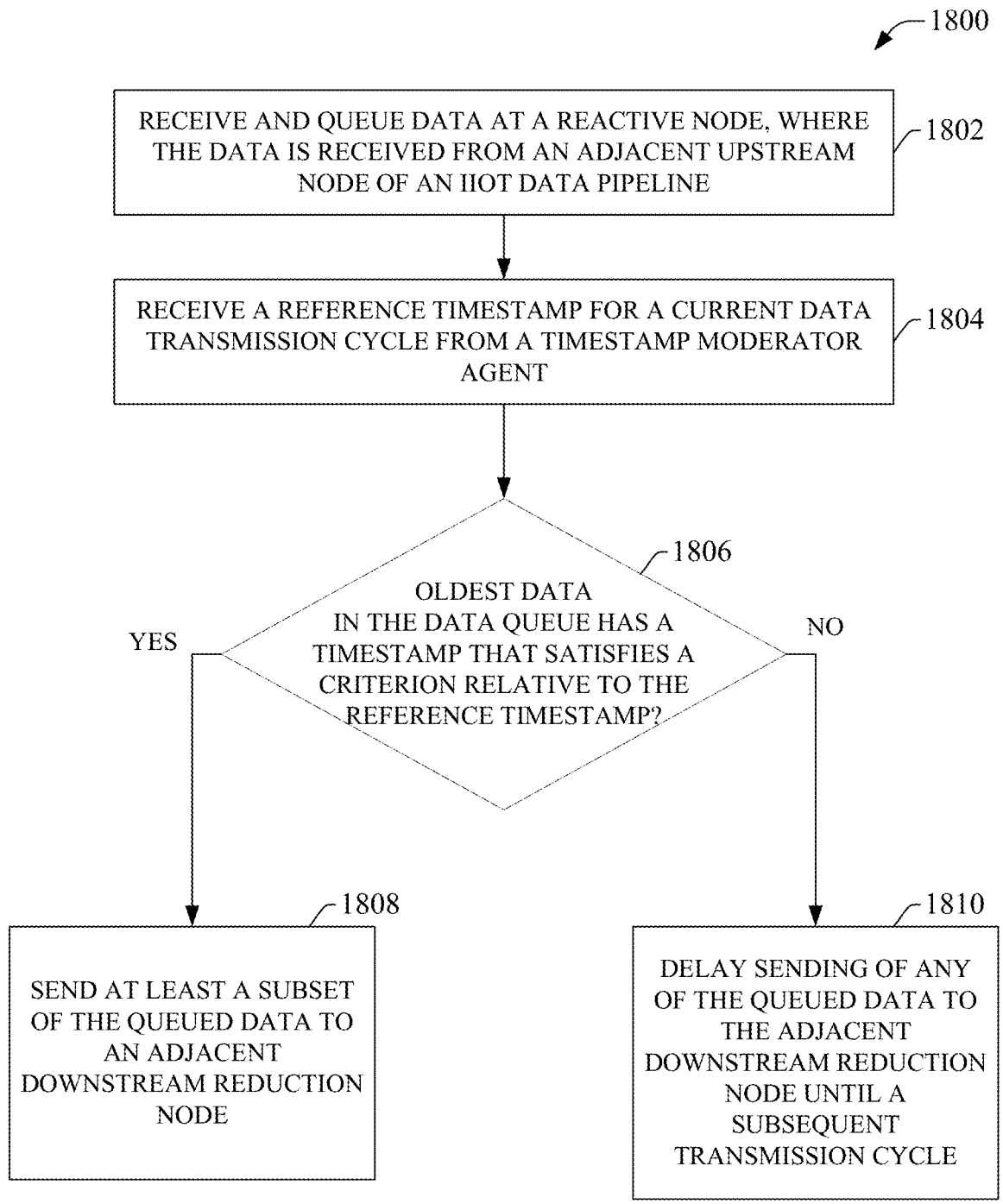
FIG. 18 is a flowchart of an example methodology for maintaining synchronization of data stamps within a node layer of network of parallel IIoT data pipelines.

FIG. 18 illustrates an example methodology 1800 for maintaining synchronization of data stamps within a node layer of network of parallel IIoT data pipelines. Initially, at 1802, data is received and queued at a reactive node that is part of the network of parallel IIoT data pipelines. At 1804, a reference timestamp for a current data transmission cycle is received from a timestamp moderator agent that monitors timestamps of data currently queued at each node of the pipeline network. The timestamp reference is specific to the node layer of the parallel pipeline network in which the node resides and regulates transmission of data batches from the nodes in that layer.

At 1806, a determination is made as to whether the oldest data in the data queue has a timestamp that satisfies a criterion relative to the reference timestamp received at step 1804. The timestamp of the oldest data can be considered as having satisfied the criterion if the timestamp of the oldest data is not later than the timestamp indicated by the reference timestamp in excess of a defined lag time. If the oldest data has a timestamp that satisfies the criterion (YES at step 1806), the methodology proceeds to step 1808, where at least a subset of the queued data is sent to an adjacent downstream reduction node of the pipeline network. Alternatively, if the oldest data has a timestamp that does not satisfy the criterion (NO at step 1806), the methodology proceeds to step 1810, where sending of any of the queued data to the adjacent downstream reduction node is delayed until a subsequent transmission cycle.

Figure 19:
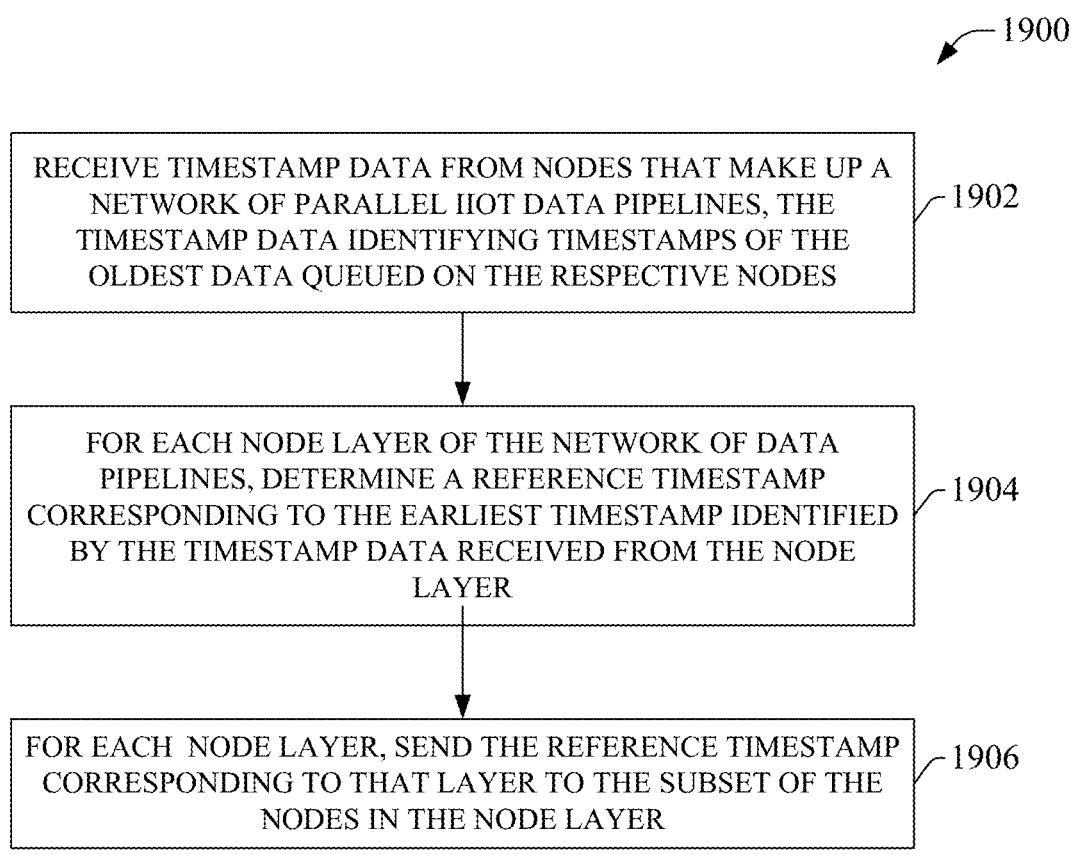
FIG. 19 is a flowchart of an example methodology for generating a reference timestamp to be used by nodes of a layer of a parallel IIoT data pipeline network to maintain synchronization of timestamps within the nodes.

FIG. 19 illustrates an example methodology 1900 for generating a reference timestamp to be used by nodes of a layer of a parallel IIoT data pipeline network to maintain synchronization of timestamps within the nodes. Initially, at 1902, timestamp data is received from nodes that make up a network of parallel IIoT data pipelines. The timestamp data identifies timestamps of the oldest data queued on the respective nodes. At 1904, for each node layer of the network of data pipelines, a reference timestamp is determined that corresponds to the earliest timestamp identified by the timestamp data received at step 1902. At 1906, the reference timestamp determined at step 1904 for each node layer is sent to the subset of the nodes within that layer.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 20:
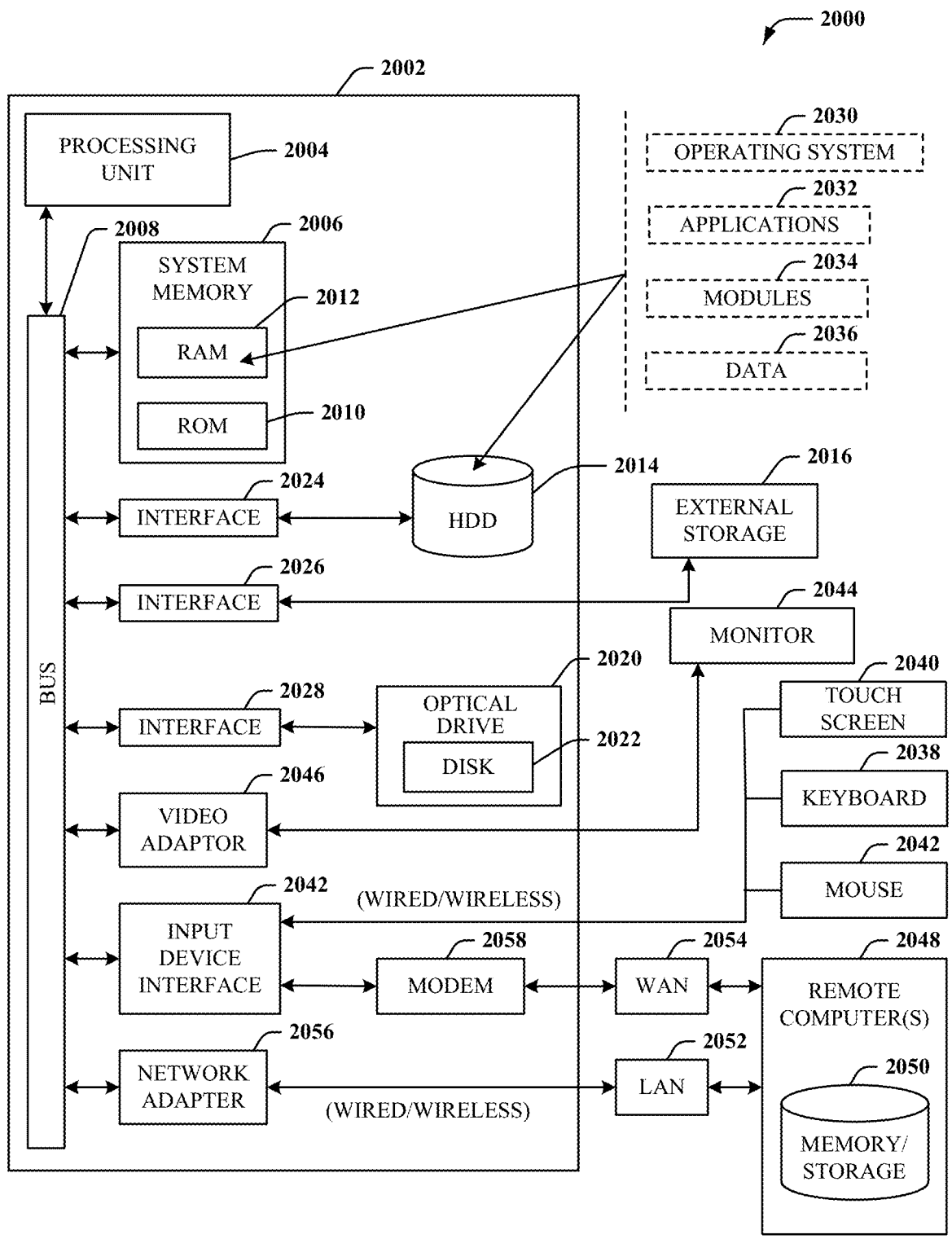
FIG. 20 is an example computing environment.
Figure 21:
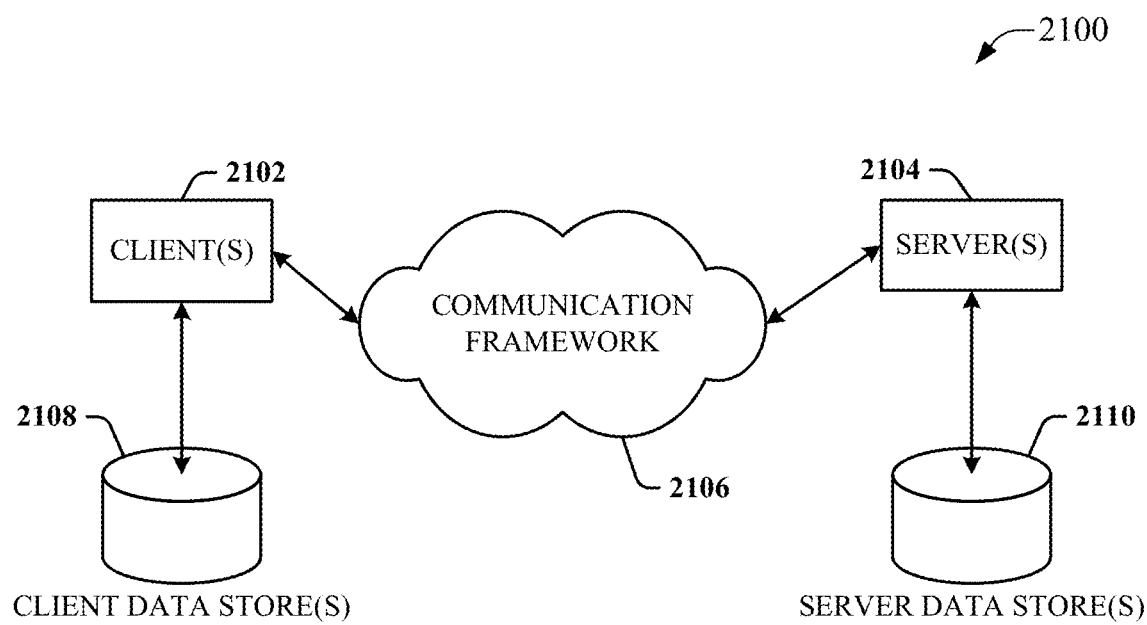
FIG. 21 is an example networking environment.

In order to provide a context for the various aspects of the disclosed subject matter, FIGS. 20 and 21 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 20 the example environment 2000 for implementing various embodiments of the aspects described herein includes a computer 2002, the computer 2002 including a processing unit 2004, a system memory 2006 and a system bus 2008. The system bus 2008 couples system components including, but not limited to, the system memory 2006 to the processing unit 2004. The processing unit 2004 can be any of various commercially available processors. Dual microprocessors and other multi-processor architectures can also be employed as the processing unit 2004.

The system bus 2008 can be any of several types of bus structure that can further interconnect to a memory bus (with or without a memory controller), a peripheral bus, and a local bus using any of a variety of commercially available bus architectures. The system memory 2006 includes ROM 2010 and RAM 2012. A basic input/output system (BIOS) can be stored in a non-volatile memory such as ROM, erasable programmable read only memory (EPROM), EEPROM, which BIOS contains the basic routines that help to transfer information between elements within the computer 2002, such as during startup. The RAM 2012 can also include a high-speed RAM such as static RAM for caching data.

The computer 2002 further includes an internal hard disk drive (HDD) 2014 (e.g., EIDE, SATA), one or more external storage devices 2016 (e.g., a magnetic floppy disk drive (FDD) 2016, a memory stick or flash drive reader, a memory card reader, etc.) and an optical disk drive 2020 (e.g., which can read or write from a CD-ROM disc, a DVD, a BD, etc.). While the internal HDD 2014 is illustrated as located within the computer 2002, the internal HDD 2014 can also be configured for external use in a suitable chassis (not shown). Additionally, while not shown in environment 2000, a solid state drive (SSD) could be used in addition to, or in place of, an HDD 2014. The HDD 2014, external storage device(s) 2016 and optical disk drive 2020 can be connected to the system bus 2008 by an HDD interface 2024, an external storage interface 2026 and an optical drive interface 2028, respectively. The interface 2024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2012, including an operating system 2030, one or more application programs 2032, other program modules 2034 and program data 2036. All or portions of the operating system, applications, modules, and/or data can also be cached in the RAM 2012. The systems and methods described herein can be implemented utilizing various commercially available operating systems or combinations of operating systems.

Computer 2002 can optionally comprise emulation technologies. For example, a hypervisor (not shown) or other intermediary can emulate a hardware environment for operating system 2030, and the emulated hardware can optionally be different from the hardware illustrated in FIG. 20. In such an embodiment, operating system 2030 can comprise one virtual machine (VM) of multiple VMs hosted at computer 2002. Furthermore, operating system 2030 can provide runtime environments, such as the Java runtime environment or the .NET framework, for application programs 2032. Runtime environments are consistent execution environments that allow application programs 2032 to run on any operating system that includes the runtime environment. Similarly, operating system 2030 can support containers, and application programs 2032 can be in the form of containers, which are lightweight, standalone, executable packages of software that include, e.g., code, runtime, system tools, system libraries and settings for an application.

Further, computer 2002 can be enable with a security module, such as a trusted processing module (TPM). For instance with a TPM, boot components hash next in time boot components, and wait for a match of results to secured values, before loading a next boot component. This process can take place at any layer in the code execution stack of computer 2002, e.g., applied at the application execution level or at the operating system (OS) kernel level, thereby enabling security at any level of code execution.

A user can enter commands and information into the computer 2002 through one or more wired/wireless input devices, e.g., a keyboard 2038, a touch screen 2040, and a pointing device, such as a mouse 2042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2004 through an input device interface 2044 that can be coupled to the system bus 2008, but can be connected by other interfaces, such as a parallel port, an IEEE 1394 serial port, a game port, a USB port, an IR interface, a BLUETOOTH® interface, etc.

A monitor 2044 or other type of display device can be also connected to the system bus 2008 via an interface, such as a video adapter 2046. In addition to the monitor 2044, a computer typically includes other peripheral output devices (not shown), such as speakers, printers, etc.

The computer 2002 can operate in a networked environment using logical connections via wired and/or wireless communications to one or more remote computers, such as a remote computer(s) 2048. The remote computer(s) 2048 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory/storage device 2050 is illustrated. The logical connections depicted include wired/wireless connectivity to a local area network (LAN) 2052 and/or larger networks, e.g., a wide area network (WAN) 2054. Such LAN and WAN networking environments are commonplace in offices and companies, and facilitate enterprise-wide computer networks, such as intranets, all of which can connect to a global communications network, e.g., the Internet.

When used in a LAN networking environment, the computer 2002 can be connected to the local network 2052 through a wired and/or wireless communication network interface or adapter 2056. The adapter 2056 can facilitate wired or wireless communication to the LAN 2052, which can also include a wireless access point (AP) disposed thereon for communicating with the adapter 2056 in a wireless mode.

When used in a WAN networking environment, the computer 2002 can include a modem 2058 or can be connected to a communications server on the WAN 2054 via other means for establishing communications over the WAN 2054, such as by way of the Internet. The modem 2058, which can be internal or external and a wired or wireless device, can be connected to the system bus 2008 via the input device interface 2042. In a networked environment, program modules depicted relative to the computer 2002 or portions thereof, can be stored in the remote memory/storage device 2050. It will be appreciated that the network connections shown are example and other means of establishing a communications link between the computers can be used.

When used in either a LAN or WAN networking environment, the computer 2002 can access cloud storage systems or other network-based storage systems in addition to, or in place of, external storage devices 2016 as described above. Generally, a connection between the computer 2002 and a cloud storage system can be established over a LAN 2052 or WAN 2054 e.g., by the adapter 2056 or modem 2058, respectively. Upon connecting the computer 2002 to an associated cloud storage system, the external storage interface 2026 can, with the aid of the adapter 2056 and/or modem 2058, manage storage provided by the cloud storage system as it would other types of external storage. For instance, the external storage interface 2026 can be configured to provide access to cloud storage sources as if those sources were physically connected to the computer 2002.

The computer 2002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 21 is a schematic block diagram of a sample computing environment 2100 with which the disclosed subject matter can interact. The sample computing environment 2100 includes one or more client(s) 2102. The client(s) 2102 can be hardware and/or software (e.g., threads, processes, computing devices). The sample computing environment 2100 also includes one or more server(s) 2104. The server(s) 2104 can also be hardware and/or software (e.g., threads, processes, computing devices). The servers 2104 can house threads to perform transformations by employing one or more embodiments as described herein, for example. One possible communication between a client 2102 and servers 2104 can be in the form of a data packet adapted to be transmitted between two or more computer processes. The sample computing environment 2100 includes a communication framework 2106 that can be employed to facilitate communications between the client(s) 2102 and the server(s) 2104. The client(s) 2102 are operably connected to one or more client data store(s) 2108 that can be employed to store information local to the client(s) 2102. Similarly, the server(s) 2104 are operably connected to one or more server data store(s) 2110 that can be employed to store information local to the servers 2104.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A node system, comprising:
   a memory that stores executable components; and
   a processor, operatively coupled to the memory, that executes the executable components, the executable components comprising:
   a data input component configured to receive industrial data from an adjacent upstream node system of a data pipeline and to queue the industrial data to yield queued data;
   a data output component configured to send subsets of the queued data to an adjacent downstream node system of the data pipeline in data batches;
   a batch size calculation component configured to set a size of a next data batch, of the data batches, to be sent to the adjacent downstream node system based on performance metric data received from the adjacent downstream node system, wherein the batch size calculation component is configured to set the size of the next data batch by offsetting the size of the next data batch relative to a default data batch size, and the amount of the offsetting is based on a difference between a downstream processing latency reported by the performance metric data and an expected processing latency; and
   a batch size setting component configured to instruct the data output component to send the next data batch in accordance with the size determined by the batch size calculation component.

2. The node system of claim 1, wherein the batch size calculation component is configured to reduce the size of the next data batch as a function of increasing downstream processing latency as determined based on the downstream processing latency reported by performance metric data.

3. The node system of claim 1, wherein
   the performance metric data comprises processing latency information for the adjacent downstream node system and one or more other node systems located downstream relative to the adjacent downstream node system, and
   the batch size calculation component is configured to determine, as the downstream processing latency, a cumulative downstream processing latency based on the processing latency information.

4. The node system of claim 3, wherein
   the batch size calculation component is configured to determine the cumulative downstream processing latency as a sum of a first processing latency of the adjacent downstream node system and at least one second processing latency of the one or more other node systems located downstream relative to the adjacent downstream node system, and
   the first processing latency and the second processing latency are reported in the performance metric data.

5. The node system of claim 3, wherein the amount of the offsetting is further based on a product of the difference between the cumulative downstream processing latency and the expected processing latency and a coefficient representing a slope of a defined relationship between data batch size and processing latency.

6. The node system of claim 1, wherein
   the performance metric data is first performance metric data, and
   the executable components further comprise a performance monitoring component configured to send second performance metric data to the adjacent upstream node system, the second performance metric data reporting a processing latency of the node system and of the adjacent downstream node system.

7. The node system of claim 1, further comprising a timestamp alignment component configured to control a timing of release of the next data batch based on a reference timestamp received from a time moderator agent.

8. The node system of claim 7, wherein the timestamp alignment component is configured to permit release of the next data batch during a current data transmission cycle of the data pipeline in response to determining that an oldest timestamp associated with the queued data is not more recent than the reference timestamp in excess of a defined lag time.

9. A method, comprising:
   queuing, by a node system comprising a processor, industrial data received from an adjacent upstream node system of a data pipeline to yield queued data;
   setting, by the node system, a size of a next data batch to be sent to an adjacent downstream node system of the data pipeline based on performance metric data received from the adjacent downstream node system, wherein the setting comprises:
   determining an offset amount based on a difference between a downstream processing latency reported by the performance metric data and an expected processing latency, and
   offsetting, by the offset amount, the size of the next data batch relative to a default data batch size; and
   sending, by the node system, a subset of the queued data to the adjacent downstream node system of the data pipeline as the next data batch in accordance with the size.

10. The method of claim 9, wherein the setting of the size of the next batch comprises reducing the size of the next data batch as a function of increasing downstream processing latency as determined based on the performance metric data.

11. The method of claim 9, wherein
   the performance metric data comprises processing latency information for the adjacent downstream node system and for one or more other node systems located downstream relative to the adjacent downstream node system, and the setting of the size of the next batch comprises:
    determining, as the downstream processing latency, a cumulative downstream processing latency based on the processing latency information, and
    setting the size of the next data batch based on the cumulative downstream processing latency.

12. The method of claim 11, wherein the determining of the cumulative downstream processing latency comprises determining the cumulative downstream processing latency as a sum of a first processing latency of the adjacent downstream node system and at least one second processing latency of the one or more other node systems located downstream relative to the adjacent downstream node system.

13. The method of claim 11, wherein the setting of the offset amount comprises determining the offset amount further based on a product of the difference between the cumulative downstream processing latency and the expected processing latency and a coefficient representing a slope of a defined relationship between data batch size and processing latency.

14. The method of claim 9, wherein
    the performance metric data is first performance metric data, and
    the method further comprises sending, by the node system, second performance metric data to the adjacent upstream node system, the second performance metric data reporting a processing latency of the node system.

15. The method of claim 9, wherein the sending comprises controlling a release time of the next data batch based on a reference timestamp received from a time moderator agent.

16. The method of claim 15, wherein the controlling the release time comprises permitting release of the next data batch during a current data transmission cycle of the data pipeline in response to determining that an oldest timestamp associated with the queued data is not more recent than the reference timestamp in excess of a defined lag time.

17. A non-transitory computer-readable medium having stored thereon instructions that, in response to execution, cause a node system comprising a processor and acting as a node of a data pipeline to perform operations, the operations comprising:
    queuing industrial data received from an adjacent upstream node system of the data pipeline to yield queued data;
    setting a size of a next data batch to be sent to an adjacent downstream node system of the data pipeline based on performance metric data received from the adjacent downstream node system, wherein the setting comprises offsetting the size of the next data batch relative to a default data batch size by an offset amount determined based on a difference between a downstream processing latency reported by the performance metric data and a defined expected processing latency; and
    sending a subset of the queued data to the adjacent downstream node system of the data pipeline as the next data batch in accordance with the size.

18. The non-transitory computer-readable medium of claim 17, wherein the setting of the size of the next batch comprises reducing the size of the next data batch as a function of increasing downstream processing latency as determined based on the performance metric data.

19. The non-transitory computer-readable medium of claim 17, wherein
    the performance metric data comprises processing latency information for the adjacent downstream node system and for one or more other node systems located downstream relative to the adjacent downstream node system, and
    the setting of the size of the next batch comprises:
        determining, as the downstream processing latency, a cumulative downstream processing latency based on the processing latency information, and
        setting the size of the next data batch based on the cumulative downstream processing latency.

20. The non-transitory computer-readable medium of claim 17, wherein the sending comprises controlling a release time of the next data batch based on a reference timestamp received from a time moderator agent.

* * * * *